US012197283B2

(12) United States Patent
Kanter et al.

(10) Patent No.: US 12,197,283 B2
(45) Date of Patent: Jan. 14, 2025

(54) EFFICIENT HARD DECODING OF ERROR CORRECTION CODE VIA EXTRINSIC BIT INFORMATION

(71) Applicant: Kioxia Corporation, Tokyo (JP)

(72) Inventors: Ofir Kanter, Haifa (IL); Avi Steiner, Kiriat Motzkin (IL)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/184,862

(22) Filed: Mar. 16, 2023

(65) Prior Publication Data

US 2024/0311236 A1    Sep. 19, 2024

(51) Int. Cl.
*G06F 11/10*    (2006.01)
(52) U.S. Cl.
CPC .................. *G06F 11/1068* (2013.01)
(58) Field of Classification Search
CPC .................................................. G06F 11/1068
See application file for complete search history.

(56) References Cited

U.S. PATENT DOCUMENTS

| | | | |
|---|---|---|---|
| 11,082,069 B1 | 8/2021 | Steiner et al. | |
| 11,258,466 B1 | 2/2022 | Kanter et al. | |
| 11,563,450 B1 | 1/2023 | Kanter et al. | |
| 2017/0269992 A1* | 9/2017 | Bandic | G06F 11/1048 |
| 2018/0159559 A1 | 6/2018 | Bazarsky et al. | |
| 2019/0295665 A1* | 9/2019 | Kojima | G11C 16/08 |
| 2020/0104209 A1* | 4/2020 | El Gamal | G11C 29/52 |
| 2020/0218596 A1 | 7/2020 | Lu et al. | |
| 2020/0293398 A1 | 9/2020 | Symons et al. | |
| 2021/0397514 A1* | 12/2021 | Hwang | G06F 11/1076 |
| 2022/0066670 A1* | 3/2022 | Naik | G06F 3/0641 |
| 2023/0251930 A1* | 8/2023 | Nemati | G06F 11/1048 714/764 |

OTHER PUBLICATIONS

Co-Pending U.S. Appl. No. 17/406,929, "System and Method for Dynamic Inter-Cell Interference Compensation in Non-Volatile Memory Storage Devices", Avi Steiner, et al., filed Aug. 19, 2021.
Co-Pending U.S. Appl. No. 17/407,096, "System and Method for Dynamic Compensation for Multiple Interference Sources in Non-Volatile Memory Storage Devices", Avi Steiner, et al., filed Aug. 19, 2021.

(Continued)

*Primary Examiner* — Samir W Rizk
(74) *Attorney, Agent, or Firm* — Foley & Lardner LLP

(57) ABSTRACT

Aspects can include selecting memory locations at a memory device, the memory locations corresponding to a first page including a first plurality of bits and a second plurality of pages including corresponding second pluralities of bits, obtaining, based on the second pluralities of bits, extrinsic page information for a proposed error solution including a third plurality of bits indicating a reliability of respective bits of the first plurality of bits, and rejecting, in response to a determination that the proposed error solution indicates a modification to a reliable bit among the first plurality of bits, the proposed error solution to eliminate a false correction of the first plurality of bits.

20 Claims, 21 Drawing Sheets

(56) References Cited

OTHER PUBLICATIONS

Co-Pending U.S. Appl. No. 17/574,929, "System and Method for Pre-Soft-Decoding Tracking Form Nand Flash Memories", Hanan Weingarten, filed Jan. 13, 2022.
Co-Pending U.S. Appl. No. 17/702,359, "Dynamic Interference Compensation for Soft Decoding in Non-Volatile Memory Storage Devices", Avi Steiner, et al., filed Mar. 23, 2022.
Notice of Allowance in U.S. Appl. No. 18/185,198 dated Jun. 17, 2024.

* cited by examiner

| Output 610A | | 1 | 1 | 0 | 0 | 1 | 1 | 0 | 0 | 0 | 0 | 0 | 1 | 1 | 0 | 1 | 1 | 0 |
|---|---|---|---|---|---|---|---|---|---|---|---|---|---|---|---|---|---|---|
| Input | LOWER 540 | 1 | 0 | 1 | 0 | 1 | 0 | 0 | 0 | 0 | 1 | 0 | 0 | 1 | 1 | 1 | 0 | 0 |
| | MIDDLE 530 | 1 | 1 | 0 | 1 | 0 | 1 | 0 | 0 | 1 | 0 | 0 | 1 | 1 | 0 | 1 | 1 | 0 |
| | UPPER 520 | 1 | 1 | 1 | 1 | 0 | 0 | 0 | 0 | 1 | 1 | 1 | 0 | 1 | 1 | 0 | 0 | 0 |

612A — inputs · 614A — Extrinsic information for TOP page (QLC)

| Output 610B | | | | | | | | | | | | | | | | | |
|---|---|---|---|---|---|---|---|---|---|---|---|---|---|---|---|---|---|
| Input | | Extrinsic Information for UPPER page (QLC) | | | | | | | | | | | | | | | |
| | LOWER 540 | 1 | 1 | 0 | 1 | 0 | 1 | 1 | 1 | 1 | 0 | 0 | 1 | 1 | 1 | 1 | 1 |
| | MIDDLE 530 | 1 | 0 | 1 | 0 | 1 | 0 | 0 | 1 | 0 | 1 | 0 | 0 | 0 | 1 | 1 | 1 |
| | TOP 510 | 1 | 1 | 1 | 1 | 0 | 0 | 1 | 0 | 0 | 0 | 0 | 0 | 0 | 0 | 0 | 1 |

612B  614B

| Output 610C | 1 | 0 | 0 | 1 | 1 | 1 | 0 | 0 | 0 | 0 | 1 | 1 | 0 | 1 | 1 |
|---|---|---|---|---|---|---|---|---|---|---|---|---|---|---|---|
| Input — LOWER 540 | 1 | 0 | 1 | 1 | 1 | 1 | 0 | 0 | 0 | 0 | 0 | 1 | 0 | 1 | 1 |
| Input — UPPER 520 | 1 | 0 | 1 | 1 | 0 | 0 | 0 | 1 | 0 | 1 | 1 | 1 | 1 | 0 | 0 |
| Input — TOP 510 | 1 | 1 | 1 | 1 | 0 | 1 | 0 | 1 | 0 | 0 | 0 | 1 | 0 | 0 | 1 |

Extrinsic Information for MIDDLE page (QLC)

| Output 610D | | 0 | 1 | 1 | 1 | 1 | 1 | 0 | 0 | 0 | 1 | 1 | 1 | 1 | 1 | 1 | 1 |
|---|---|---|---|---|---|---|---|---|---|---|---|---|---|---|---|---|---|
| Input | MIDDLE 530 | 1 | 1 | 0 | 0 | 0 | 1 | 0 | 0 | 1 | 1 | 1 | 1 | 0 | 0 | 1 | 1 |
| | UPPER 520 | 1 | 1 | 1 | 1 | 0 | 0 | 1 | 0 | 1 | 0 | 1 | 0 | 1 | 1 | 0 | 0 |
| | TOP 510 | 1 | 1 | 1 | 1 | 1 | 0 | 1 | 0 | 0 | 1 | 1 | 0 | 0 | 0 | 0 | 1 |
| | | | | | | Extrinsic Information for LOWER page (QLC) | | | | | | | | | | | |

EFFICIENT HARD DECODING OF ERROR CORRECTION CODE VIA EXTRINSIC BIT INFORMATION

TECHNICAL FIELD

The present disclosure relates generally to systems and methods for hard decoding for correcting errors in data storage devices.

BACKGROUND

Flash memory devices (e.g., NAND flash memory devices) enable page reads based on voltage thresholds of the flash memory devices. Due to different noise (e.g., NAND noise) and interference sources during programming and read, errors on information bits stored in flash memory devices can occur. Such errors may be due to one or more of programming errors, reads with non-optimal thresholds, retention/read-disturb stresses, and so on. A strong error correction code (ECC) can allow fast programming (with possibly high programming errors) and reads under high stress conditions and/or with low-complexity digital signal processing (DSP).

SUMMARY

This technical solution is directed at least to a hard decoder device integrable with a memory device. The hard decoder can identify bits with high likelihood of accuracy and bits with low likelihood of accuracy, based on extrinsic page information that includes bits of one or more pages in addition to a page being addressed. The likelihood of accuracy can indicate a reliability of particular bit of a particular page. The hard decoder can determine whether to perform a decoding or error correction process with respect to a particular bit, based on the indication of reliability derived from extrinsic page information, to decide whether a bit should be fixed or not. The extrinsic page information can be based, for example, on the logical values of other bits in same cell in same row. For example, data to generate extrinsic-page information is already buffered in memory controller, and thus can be generated with no additional latency. The extrinsic-page information can be obtained at or by the hard decoder by reads using read thresholds of various pages. Thus, a technical solution for efficient hard decoding of error correction code via extrinsic bit information is provided. The technical solution can provide a technical improvement of at least increasing error correction capability in a memory device with no additional latency. In some system flows, the extrinsic-page information is available without additional NAND reads, to provide at least the technical improvement increasing error correction capability in a memory device with no additional latency. Thus, this technical solution is directed at least to a decoder with higher error correction capability and reduced latency that improves system Quality Of Service (QoS) of a memory device or system. However, a person of ordinary skill in the art would understand that other benefits and improvements can be derived without departing from the spirits of the invention.

At least one aspect is directed to a method of verifying correction detection in a memory device. The method can include selecting a plurality of memory locations at a memory device, the memory locations corresponding to a first page that can include a first plurality of bits and a second plurality of pages that can include corresponding second pluralities of bits. The method can include obtaining, based on the second pluralities of bits, extrinsic page information of a proposed error solution that can include a third plurality of bits indicating a reliability of respective bits of the first plurality of bits. The method can include rejecting, in response to a determination that the proposed error solution indicates a modification to a reliable bit among the first plurality of bits, the proposed error solution to eliminate a false correction of the first plurality of bits.

At least one aspect is directed to a memory system that can include a page of a non-volatile memory. The system can include a controller for performing operations of the page of the non-volatile memory, the circuit being configured. The system can select a plurality of memory locations at a memory device, the memory locations corresponding to a first page that can include a first plurality of bits and a second plurality of pages that can include corresponding second pluralities of bits. The system can obtain, based on the second pluralities of bits, extrinsic page information of a proposed error solution that can include a third plurality of bits indicating a reliability of respective bits of the first plurality of bits. The system can reject, in response to a determination that the proposed error solution indicates a modification to a reliable bit among the first plurality of bits, the proposed error solution to eliminate a false correction of the first plurality of bits.

At least one aspect is directed to a non-transitory computer readable medium can include one or more instructions stored thereon and executable by a processor. The processor can select, by a processor, a plurality of memory locations at a memory device, the memory locations corresponding to a first page the can include a first plurality of bits and a second plurality of pages that can include corresponding second pluralities of bits. The processor can obtain, based on the second pluralities of bits, extrinsic page information of a proposed error solution that can include a third plurality of bits indicating a reliability of respective bits of the first plurality of bits. The processor can reject, in response to a determination that the proposed error solution indicates a modification to a reliable bit among the first plurality of bits, the proposed error solution.

BRIEF DESCRIPTION OF THE DRAWINGS

FIG. 6A depicts an example bit reliability matrix for top page, according to some arrangements;

FIG. 6B depicts an example bit reliability matrix for upper page, according to some arrangements;

FIG. 6C depicts an example bit reliability matrix for middle page, according to some arrangements;

FIG. 6D depicts an example bit reliability matrix for lower page, according to some arrangements;

Figure 1:
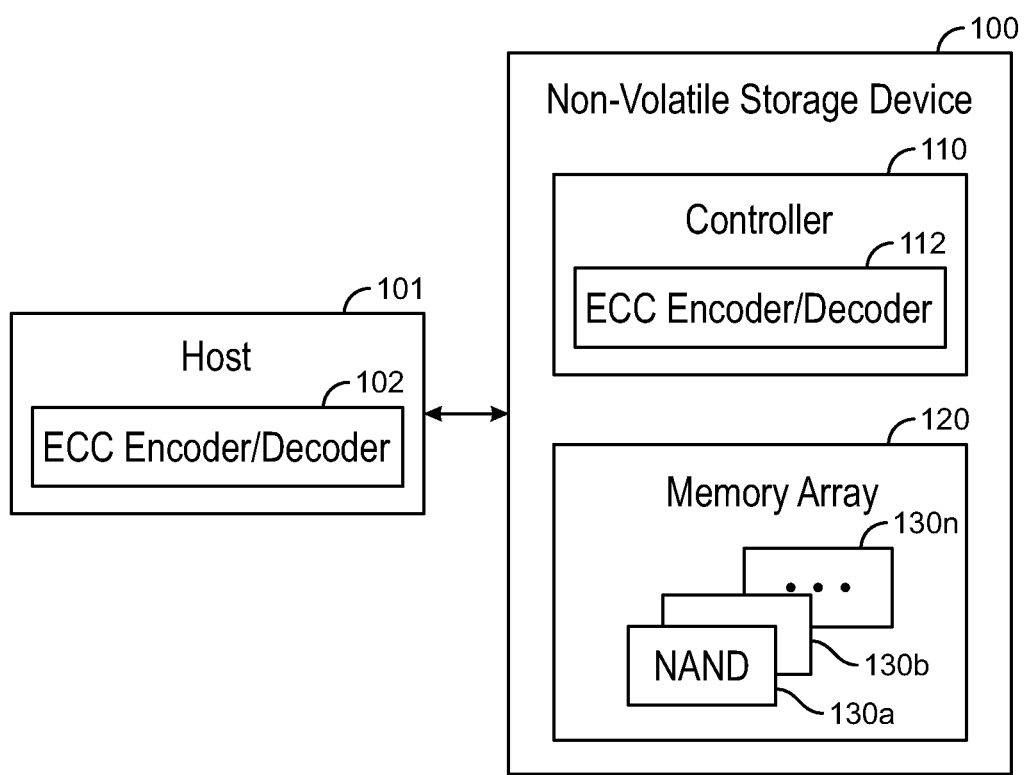
FIG. 1 shows a block diagram of examples of a system including a non-volatile storage device and a host, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems and methods for hard decoding for correcting errors in data storage devices are discussed. In various NAND devices, multiple bits are stored in a same cell. Groups of multiple bits can correspond to pages, and bits stored in a same cell can correspond to rows. When a memory device reds and decodes data stored on one page, the device can use the data from other pages on same row in order to provide reliability information for the target codeword. Data from other pages can correspond to one or more bits indicating reliability or values at other pages, and can correspond to extrinsic page information. Thus, the memory device can have improved error correction capability and concurrently reduce the latency of the hard decoding process. In some system flows, this extrinsic page information is available without additional NAND reads, and therefore can be used to achieve higher hard-decoder capability with no additional latency. For example, NAND data modulation during a programing flow may be used during read flow to indicate reliability of one or more bits. The technical solution can leverage phenomena including occurrence of errors between neighboring states rather than distanced states. The memory device or the hard decoder can generate extrinsic page information. The extrinsic page information can be used in the decoding process to provide a technical improvement to error correction capability, and to reduce average decoding latency.

This technical solution can achieve one or more technical improvements including at least those discussed herein. For example, this technical solution can obtain improved hard decoding capability without adding NAND read overhead. Performing just a single read for target page, and using previous reads of other pages, allows generating reliability information per codeword bit, which improves the decoding capability. Other read pages need not be decoded, since the values on the bits associated with target codeword are highly reliable. For example, this technical solution can provide reliability information from read operations for a target codeword during sequential reading, refresh operations, and multi-level redundancy with multiple hard decoder stages with latency matching read operations with lower error correction capability. For example, this technical solution can provide hard decoding at high performance with two-level LLR (reliability information), by using reliability LLR values for rejecting component-corrections that attempt to fix high LLR bits. For example, this technical solution can provide reduced complexity hard-decoding at high performance, by employing decoding that operates over unreliable bits and rejects, blocks, defers, or skips operating on reliable bits. For example, this technical solution can iteratively update reliability information within hard decoding.

To assist in illustrating the present implementations, FIG. 1 shows a block diagram of a system including a non-volatile storage device 100 coupled to a host 101 according to some implementations. In some examples, the host 101 can be a user device operated by a user. The host 101 may include an operating system (OS), which is configured to provision a filesystem and applications which use the filesystem. The filesystem communicates with the non-volatile storage device 100 (e.g., a controller 110 of the non-volatile storage device 100) over a suitable wired or wireless communication link or network to manage storage of data in the non-volatile storage device 100. In that regard, the filesystem of the host 101 sends data to and receives data from the non-volatile storage device 100 using a suitable interface to the communication link or network.

In some examples, the non-volatile storage device 100 is located in a datacenter (not shown for brevity). The datacenter may include one or more platforms, each of which supports one or more storage devices (such as but not limited to, the non-volatile storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the non-volatile storage devices in different platforms, racks, or cabinets via a suitable networking fabric. Examples of the non-volatile storage device 100 include but are not limited to, a solid state drive (SSD), a non-volatile dual in-line memory module (NVDIMM), a Universal Flash Storage (UFS), a Secure Digital (SD) device, and so on.

The non-volatile storage device 100 includes at least a controller 110 and a memory array 120. Other components of the non-volatile storage device 100 are not shown for brevity. The memory array 120 includes NAND flash memory devices 130a-130n. Each of the NAND flash memory devices 130a-130n includes one or more individual NAND flash dies, which are non-volatile memory (NVM) capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, dynamic random access memory (DRAM), magnetic random access memory (MRAM), phase change memory (PCM), ferro-electric RAM (FeRAM), and so on. The ECC structure described herein can be likewise implemented on memory systems using such memory technologies and other suitable memory technologies.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 130a-130n such that those NAND flash memory devices 130a-130n function as a single storage. The controller 110 can include microcontrollers, buffers, error correction systems, flash translation layer (FTL) and flash interface modules. Such functions can be implemented in hardware, software, and firmware or any combination thereof. In some arrangements, the software/firmware of the controller 110 can be stored in the non-volatile storage 120 or in any other suitable computer readable storage medium.

The controller 110 includes suitable processing and memory capabilities for executing functions described herein, among other functions. As described, the controller 110 manages various features for the NAND flash memory devices 130a-130n including, but not limited to, I/O handling, reading, writing/programming, erasing, monitoring, logging, error handling, garbage collection, wear leveling, logical to physical mapping, data protection (encryption/decryption), and the like. Thus, the controller 110 provides visibility to the NAND flash memory devices 130a-130n.

The error correction systems of the controller 110 can include or otherwise implement one or more ECC encoders and one or more ECC decoders, collectively referred to as an ECC encoder/decoder 112. The ECC encoders of the ECC encoder/decoder 112 are configured to encode data (e.g., input payload) to be programmed to the non-volatile storage 120 (e.g., to the NAND flash memory devices 130a-130n) using the ECC structures described herein. The ECC decoders of the ECC encoder/decoder 112 are configured to decode the encoded data to correct programming errors, errors caused by reading with non-optimal thresholds, errors caused by retention/read-disturb stresses, and so on, in connection with a read operation. To enable low-complexity processing, the ECC encoder/decoder 112 is implemented on hardware and/or firmware of the controller 110.

In some implementations, the host 101 includes an ECC encoder/decoder 102 that can use the ECC structures described herein. The ECC encoder/decoder 102 is software running on the host 101 and includes one or more ECC encoders and one or more ECC decoders. The ECC encoders of the ECC encoder/decoder 102 are configured to encode data (e.g., input payload) to be programmed to the non-volatile storage 120 (e.g., to the NAND flash memory devices 130a-130n) using the ECC structures described herein. The ECC decoders of the ECC encoder/decoder 102 are configured to decode the encoded data to correct errors, in connection with a read operation. In some arrangements, one of the ECC encoder/decoder 102 or the ECC encoder/decoder 112 employs the ECC structures described herein. In some implementations, the ECC encoders of the ECC encoder/decoder 102 are configured to encode data (e.g., input payload) to be written to multiple instances of the non-volatile storage device 100 using a redundancy code, examples including, but not limited to, erasure codes and RAID levels 0-6.

An encoding scheme such as the HFPC encoding scheme can be used to encode each of the plurality of short codewords. In some arrangements, the HFPC code structure is composed of multiple component codes. Each component code can be, for example, a BCH code. A number of components code n can be determined by the correction capability of each component code and code rate. For example, given a minimum distance $D_{min}$ per component code, the correction capability t of each component code can be represented by (Equation 1):

$$t = (D_{min} - 1)/2, \qquad (1)$$

where the $D_{min}$, of a linear block code is defined as the smallest Hamming distance between any pair of code vectors in the code. The number of redundancy bits r can be represented by (Equation 2):

$$r = Q \cdot (D_{min} - 1)/2, \qquad (2)$$

where Q is a Galois field parameter for the BCH component code defined over $GF(2^Q)$. Given a code rate R and payload length K bits, a number of component codes needed can be determined by (Equation 3 or Equation 4 respectively):

$$n = \left\lfloor K \cdot \frac{1-R}{r \cdot R} \right\rfloor, \qquad (3)$$

and $$n = \left\lfloor 2K \cdot \frac{1-R}{Q \cdot (D_{min} - 1) \cdot R} \right\rfloor. \qquad (4)$$

In some examples, input payload bits (e.g., including the information bits and the signature bits) are arranged in a pseudo triangular matrix form and to perform folded encoding (e.g., folded BCH encoding) for every component code. In some examples, every bit in a payload (e.g., every information bit) can be encoded by (at least) two component codes (also referred to as "code components"), and each component code intersects with all other component codes. That is, for component codes that encode the information bits, the encoding process is performed such that systematic bits of every component code is also encoded by all other component codes. The component codes together provide encoding for every information bit using the component codes.

Figure 2:
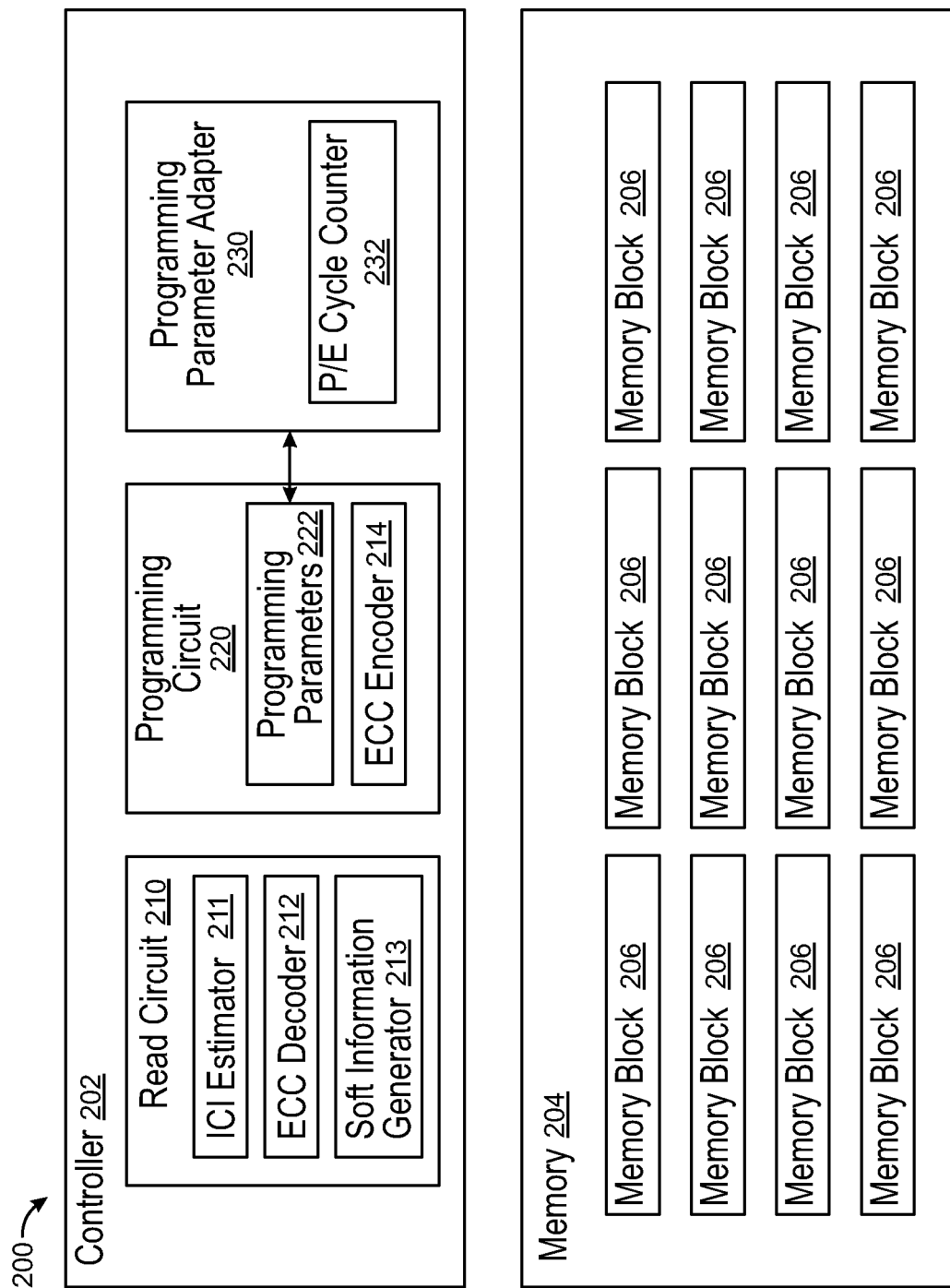
FIG. 2 is a block diagram illustrating a non-volatile storage device, according to some arrangements.

FIG. 2 is a block diagram illustrating a non-volatile storage device 200 according to some arrangements. In some arrangements, the non-volatile storage device may be a flash memory system which can perform any of the methods described in the present disclosure. Examples of the device 200 include but are not limited to, a SSD, a Non-Volatile Dual In-Line Memory Module (NVDIMM), UFS, a SD device, and so on.

In some arrangements, a different device (not shown) may communicate with the device 200 over a suitable wired or wireless communication link to execute some or all of the methods described herein. The device 200 may include a memory module or memory device 204 and a controller 202 for performing operations of the plurality of cells.

The controller 202 may include a read circuit 210, a programming circuit (e.g., a program DSP) 220 and a programming parameter adapter 230. In some arrangements, the read circuit 210 may include an ICI estimator 211, an ECC decoder 212 and/or a soft information generator 213. In some arrangements, the programming circuit 220 may include an ECC encoder 224 and programming parameters 222. In some arrangements, the programming parameter adapter 230 may include a program/erase cycle counter 232. Examples of the controller 202 include but are not limited to, an SSD controller (e.g., a client SSD controller, a datacenter SSD controller, an enterprise SSD controller, and so on), a UFS controller, or an SD controller, and the like. Arrangements of controller 202 can include additional or fewer components such as those shown in FIG. 2.

The controller 202 can combine raw data storage in the plurality of memory blocks 206 such that the memory blocks 206 function as a single storage. The controller 202 can include microcontrollers, buffers, error correction systems, flash translation layer (FTL) and flash interface modules. Such functions can be implemented in hardware, software, and firmware or any combination thereof. In some arrangements, the software/firmware of the controller 210 can be stored in the memory 204 or in any other suitable computer readable storage medium.

The controller 202 includes suitable processing and memory capabilities for executing functions described herein, among other functions. As described, the controller 202 manages various features for the memory block 206 in the memory 204 including, but not limited to, I/O handling, reading, writing/programming, erasing, monitoring, logging, error handling, garbage collection, wear leveling, logical to physical address r mapping, data protection (encryption/decryption), and the like.

In some arrangements, the ICI estimator 211 of the read circuit 210 may be configured to estimate an interference state based on a result of a read operation on a first neighboring cell of a first cell (e.g., a target cell) among the plurality of cells. In some arrangements, a statistical dependency modeling of main interference sources and their impact can be characterized. For example, the ICI estimator 211 may be configured to perform a statistical dependency modeling of interference sources and their impact.

In some arrangements, the statistical dependency modeling of main interference sources and their impact can be characterized offline. For example, statistical dependency modeling may be performed offline when different programming schemes of different non-volatile memory storage devices increases the difficulty of performing statistical dependency modeling online. For example, the programming scheme of one generation of non-volatile memory storage devices may be different from that of another generation of non-volatile memory storage devices.

In some arrangements, the ICI estimator 211 may perform a statistical dependency modeling of interference sources and their impact offline. In some arrangements, to perform such statistical dependency modeling offline for a target non-volatile memory storage device (e.g., the memory 204), the ICI estimator 211 or the computing system may store, in memory (e.g., in a mass storage device connected to an I/O (USB, IEEE1394, Small Computer System Interface (SCSI), Serial Advanced Technology Attachment (SATA), Serial Attached SCSI (SAS), PCI Express (PCIe) etc.), at least information on the programming scheme of the target non-volatile memory storage device so that it can accurately model the interference sources and their impact in the target non-volatile memory storage device.

In estimating the interference state, the ICI estimator 211 may be further configured to estimate a level at which the first neighboring cell is programmed. For example, the ICI estimator 211 may estimate, based on a result of a read operation on the first neighboring cell, a level at which the first neighboring cell is programmed. The ICI estimator 211 may then estimate an interference state of the first neighboring cell based on the estimated programmed level of the first neighboring cell. In some arrangements, the interference state of a neighboring cell is an estimated programmed level of the neighboring cell.

In estimating the interference state, the ICI estimator 211 may be further configured to obtain the result of the read operation on the first neighboring cell from pre-fetch of a next page read or by saving a previous read result. For example, in estimating the interference state for a target cell in a target page, the ICI estimator 211 may obtain a read result of a neighboring cell (of the target cell) in a next page that is to be read next to the target page, by pre-fetching the read result of the next page. In some arrangements, the ICI estimator 211 may obtain a read result of a neighboring cell (of the target cell) in a previous page that has been read prior to the target page, by saving and reusing the read result of the previous page. In this manner, in some arrangements, the ICI estimator 211 may be configured to estimate interference states for decoding results of read operations on the plurality of cells by reading the rows of the plurality of cells sequentially and only once. In some arrangements, the ICI estimator 211 may estimate the inference state of a neighboring cell from a distribution of state (or level) programmed in the neighboring cell.

In some arrangements, the ICI estimator 211 may analyze and model the interference state for a target cell as a function of one or more cells adjacent to the target cell. In some arrangements, to analyze the contribution of interference of each neighboring cell, a single neighboring row state estimation may be performed. For example, the ICI estimator 211 can estimate the interference state of a neighboring row from a hard read before decoding. In some arrangements, the ICI estimator 211 can estimate the interference state of a neighboring row post decoding as true data.

In some arrangements, once interference sources and their impact are modeled or identified, simple signal processing operations can be performed to compensate for or decouple the interference. For example, sampling results of a target page can be post-processed to compensate for or decouple the interference. In some arrangements, reliability information for reading or decoding of a target page can be provided. For example, the soft information generator 213 of the read circuit 210 may be configured to generate reliability information (e.g., calculating a probability of error) and provide soft information based on the reliability information. In some arrangements, the soft information generator 213 of the read circuit 210 may be configured to generate soft information based on the estimated interference state and a read value from the first cell.

The ECC decoder 212 may be configured to decode soft information as a result of read operations on cells. Additionally, or alternatively, the ECC decoder 212 may correct errors, improving accuracy and stress relief of a non-volatile memory storage controller. The controller 202 may also include a programming circuit 220. The programming circuit may include an ECC encoder 224 and programming parameters 222. For example, the ECC encoder 224 may determine the soft labels from the soft samples. The controller 202 may also include programming parameter adapter 230. The adapter 230 may adapt the programming parameters 222 in the programming circuit 220. The adapter 230 in this example may include a Program/Erase (P/E) cycle counter 232. Although shown separately for case of illustration, some or all of the adapter 230 may be incorporated in the programming circuit 220.

The memory 204 may be an array of memory blocks 206. The memory blocks may include non-volatile memory such as NAND flash memory, dynamic random access memory (DRAM), magnetic random access memory (MRAM), phase change memory (PCM), ferro-electric RAM (FeRAM), and so on. In some arrangements, the memory 204 may have a plurality of cells. In some arrangements, each of the memory blocks 206 may have a plurality of cells. In some arrangements, the cell memory (e.g., the memory 204 or a memory block 206) may include rows and columns of the plurality of cells. In some arrangements, a memory block 206 may include a plurality of pages (not shown) and a page may be defined as cells linked with the same wordline, which correspond to a row of cells. In some arrangements, neighboring cells of a target cell are cells adjacent to the target cell. For example, each of a first neighboring cell and a second neighboring cell (of a first cell) may be positioned at the same column as a column of the first cell and at a row adjacent to a row of the first cell. Additionally, or alternatively, the memory 204 can comprise or be implemented using a plurality of dies, each of the dies containing a plurality of the blocks 206.

Figure 3:
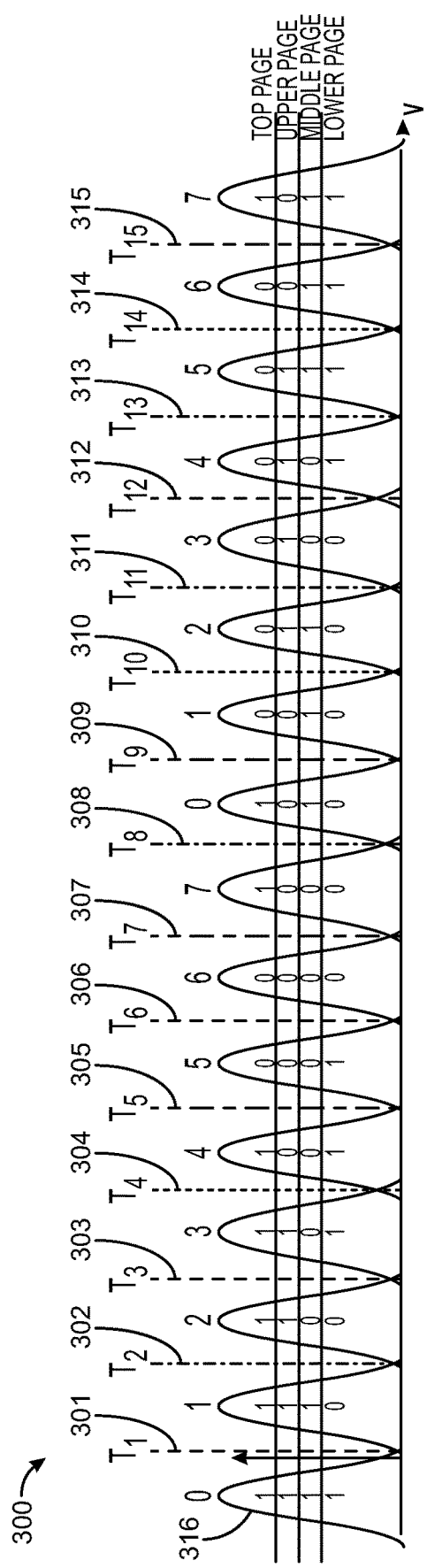
FIG. 3 is a diagram of histograms with VT distributions of a four bits per cell (bpc) non-volatile memory storage device, according to some arrangements.

FIG. 3 is a diagram of histograms 300 with VT distributions of a four bits per cell (bpc) non-volatile memory storage device (e.g., a flash memory device such as a QLC with 16 programmable states), according to some arrangements. Depicted are 16 lobes (distributions, or histograms) corresponding to the 16 different bit combinations of four bits represented by the charge state of the cell. A lower page read requires using thresholds T1 301, T3 303, T6 306 and T12 312 to separate the histograms into those with LSBs of 0 into those of LSBs of 1. Read thresholds T2 302, T8 308, T11 311, and T13 313 are used to separate the histograms into those with LSBs of 0 and those with LSBs of 1 for reading middle pages, read thresholds T4 304, T10 310, and T14 314 are used to separate the histograms into those with LSBs of 0 and those with LSBs of 1 for reading upper pages, and read thresholds T5 305, T7 307, T9 309 and T15 315 are used to separate the histograms into those with LSBs of 0 and those with LSBs of 1 for reading top pages. The lower histogram 300 may be considered the erase level.

As described herein, when read operations are performed on a target row, interference may be induced. In some implementations, a fixed ICI compensation may be added to read thresholds. However, the fixed compensation may not be effective in improving BER because depending on the ICI state, stress condition of the device, and the read threshold, the degree of the added ICI compensation varies. For example, while the effect of an induced ICI state may be known (e.g., shifting the threshold higher or lower than the ideal/optimum ICI compensation threshold associated with no ICI state threshold), the degree of the shift in the direction may be unknown.

Figure 4:
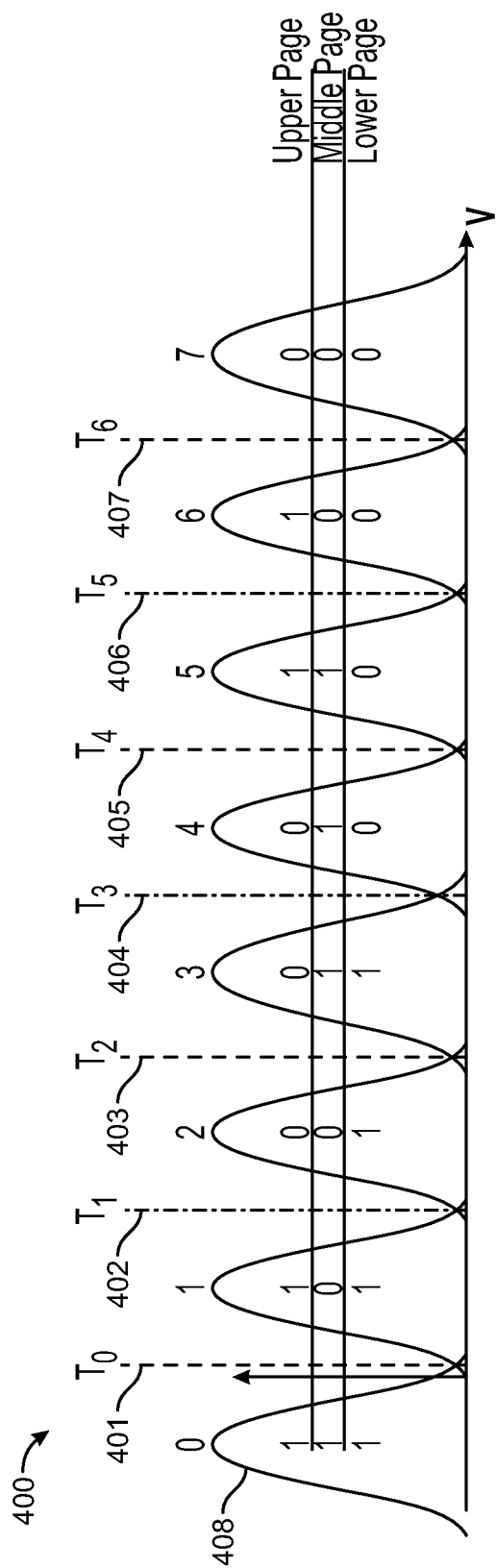
FIG. 4 is a diagram of a superposition of eight possible VT distributions of a three bits per cell flash memory device without any ICI information, according to some arrangements.

Now, arrangements of estimating an interference state will be described with reference to FIG. 4. FIG. 4 is a diagram of a superposition of the eight possible VT distributions 400 of a three bits per cell (bpc) memory device without any ICI information, according to some arrangements. Depicted are eight lobes (distributions, or histograms) corresponding to the eight different bit combinations of three bits represented by the charge state of the cell. A lower page read requires using thresholds $T_3$ 403 to separate the histograms into those with LSBs of 0 and those with LSBs of 1. Read thresholds $T_0$ 400, $T_2$ 402 and $T_5$ 405 are used to separate the histograms into those with LSBs of 0 and those with LSBs of 1 for reading middle pages, and read thresholds $T_1$ 401 $T_4$ 404 and $T_6$ 406 are used to separate the histograms into those with LSBs of 0 and those with LSBs of 1 for reading upper pages. The lower histogram 407 may be considered the erase level.

FIG. 4 shows a voltage threshold distribution of a 3 bits per cell (bpc) flash memory device. The voltage threshold (VT) distribution includes eight lobes. An MSB (most significant bit) page read requires using thresholds T0, T4. For reading CSB (center significant bit) pages the read thresholds T1, T3 and T5 are used. For reading LSB (least significant bit) pages the read thresholds T2 and T6 have to be used. The lower most distribution is known as the erase level.

Due to different NAND noise and interference sources during programming and during read, there may be errors in the programmed and read output. This can be due to programming errors, or during read with non-optimal thresholds or following retention/read-disturb stresses, etc. The result of all these noise sources is errors on the information bits that are originally saved to NAND. A strong error correction code (ECC) can allow faster programming, with possibly higher programming errors, and read under high stress conditions, and/or with lower complexity digital signal processing (DSP).

A code rate is defined by the ratio of its information content, called payload, to the overall size of a codeword. For example, for a code that contains k bits and r redundancy bits that rate is defined by $R_c = k/(k+r)$. The common encoding methods are not very well suited to support high rate codes when both hard and soft decoding are considered. For example, for conventional low-density parity-check codes (LDPC) for very high rates (say 0.9), the code length tends to be considerable resulting in a very complex and costly implementation.

In some implementations, a special structure of multi-dimensional encoding with simple code components can obtain high decoding efficiency with a reasonable complexity for both hard input or soft input to the decoder. These properties make a code especially suitable for storage applications such as NAND Flash devices or controllers for NAND flash. Some key features of this coding scheme are instrumental in designing a coding system for storage. One of the features is high raw bit error rate (RBER) error correction capability with hard input to the decoder, which is important in a storage system since it requires a single read operation. This means that high performance on read from the storage device may be achieved throughout the device lifespan. Another key feature is configurability. For example, the code rate may be configured per application, and with a single engine it is possible to configure with firmware the code parameters which determine the payload size and redundancy size. This feature allows using different codes for different type of pages, according to their RBER characteristics. Alternatively, payload size can be determined such that the tradeoff of performance vs reliability is optimized. Another key feature is high raw bit error rate (RBER) error correction capability with soft input to the decoder. This feature is important in storage systems since it can provide high reliability at high Program/Erase (P/E) cycle counts and difficult retention conditions. This feature is crucial for storage systems which typically require a very small undecodable bit error rate (UBER) of 1E-15.

In multi-dimensional encoding, a stream of data is passed through a set of multiple component encoders, which together encode the full payload into a single codeword. For example, Bose-Chaudhuri-Hocquenghem (BCH) encoding may be done by using a shift register through which the systematic data is passed. Therefore, that data simply passes through the component encoders without being modified while the shift-register advances. When the systematic data of the code completely passed through the shift-register, the content of the shift register is the redundancy of the code and is appended to the data stream. This principle works for all component encoders in all dimensions.

Multi-dimensional encoding also can be obtained with product codes or symmetric product codes, which is a special case of product codes, and may provide improved capabilities. These structures create a product of code components to obtain a full codeword, and the decoding process typically involves iterative decoding of the component codes. In some arrangements, the ECC structure includes a modified half product code, referred to as a half folded-product code (HFPC). A HFPC structure is composed of multiple small code components, where each code component can be for example a BCH code. The number of code components n is determined by the correction capability of each component and the required code rate.

FIGS. 5A-D respectively depict read states of top, upper, middle, and lower pages of a memory block. Each of the read states of can FIGS. 5A-D indicate read thresholds and bit states of a QLC device, and can each have a percentage of reliable bits that respectively correspond to each read state.

Figure 5A:
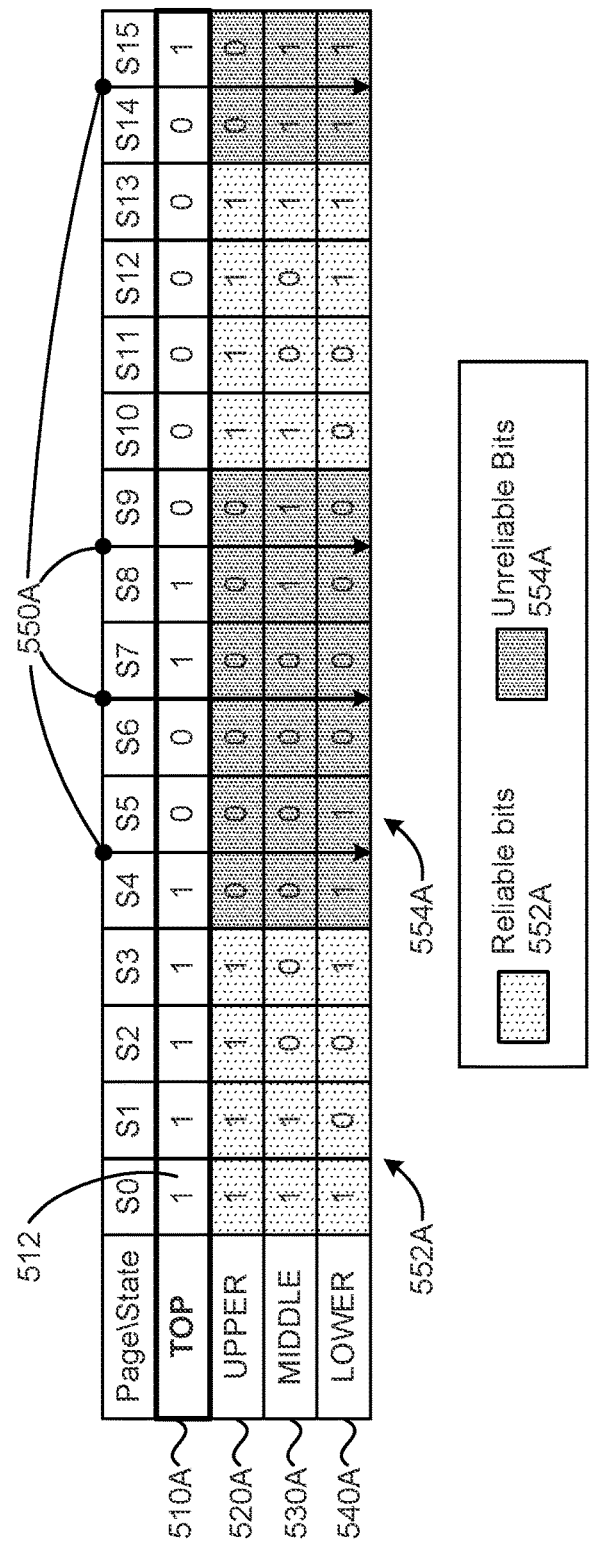
FIG. 5A depicts an example top page read state, according to some arrangements.

FIG. 5A depicts an example top page read state, in accordance with present implementations. As illustrated by way of example in FIG. 5A, an example top page read state 500A can include at least a top page 510A in the read state 500A, an upper page 520A in the read state 500A, a middle page 530A in the read state 500A, a lower page 540A in the read state 500A, and voltage thresholds 550A in the read state 500A.

The top page 510A can include a plurality of bits each having a corresponding bit value at respective bit index positions in a cell, vector, or row corresponding to the top page 510A. The top page 510A in read state 500A can be read in a read operation corresponding to the top page 510A, via the voltage thresholds 550A. The upper page 520A can include a plurality of bits each having a corresponding bit value at respective bit index positions in a cell, vector, or row corresponding to the upper page 520A. The middle page 530A can include a plurality of bits each having a corresponding bit value at respective bit index positions in a cell, vector, or row corresponding to the middle page 530A. The lower page 540A can include a plurality of bits each having a corresponding bit value at respective bit index positions in a cell, vector, or row corresponding to the lower page 540A.

The plurality of bits of the upper page 520A, middle page 530A and lower page 540A can each have a reliability characteristic dependent on the number of bit positions each bit is from a voltage threshold among the voltage thresholds 550A. For example, each bit of the plurality of bits of the upper page 520A, middle page 530A and lower page 540A in an index adjacent to a voltage threshold among the voltage thresholds 550A can have a reliability characteristic that indicates the bit is unreliable. For example, each bit of the plurality of bits of the upper page 520A, middle page 530A and lower page 540A in an index not adjacent to a voltage threshold among the voltage thresholds 550A can have a reliability characteristic that indicates the is reliable. For example, bits of the upper page 520A, middle page 530A and lower page 540A at indices S0, S1, S2, S3, S10, S11, S12 and S13 in the read state 500A can be reliable. For example, bits of the upper page 520A, middle page 530A and lower page 540A at indices S4, S5, S6, S7, S8, S9, S14 and S15 in the read state 500A can be unreliable.

The voltage thresholds 550A can correspond at least partially in one or more of structure and operation to one or more of the thresholds 301-315, modulated in accordance with read state 500A. The read state 500A can include four voltage thresholds 550A adjacent to 8-bit indices of the 16-bit indices of the memory block. Thus, the top page 500A in the read state 500A, with 8 reliable bits among 16 total bits, can correspond to a state having a 50% reliable bit state.

Figure 5B:
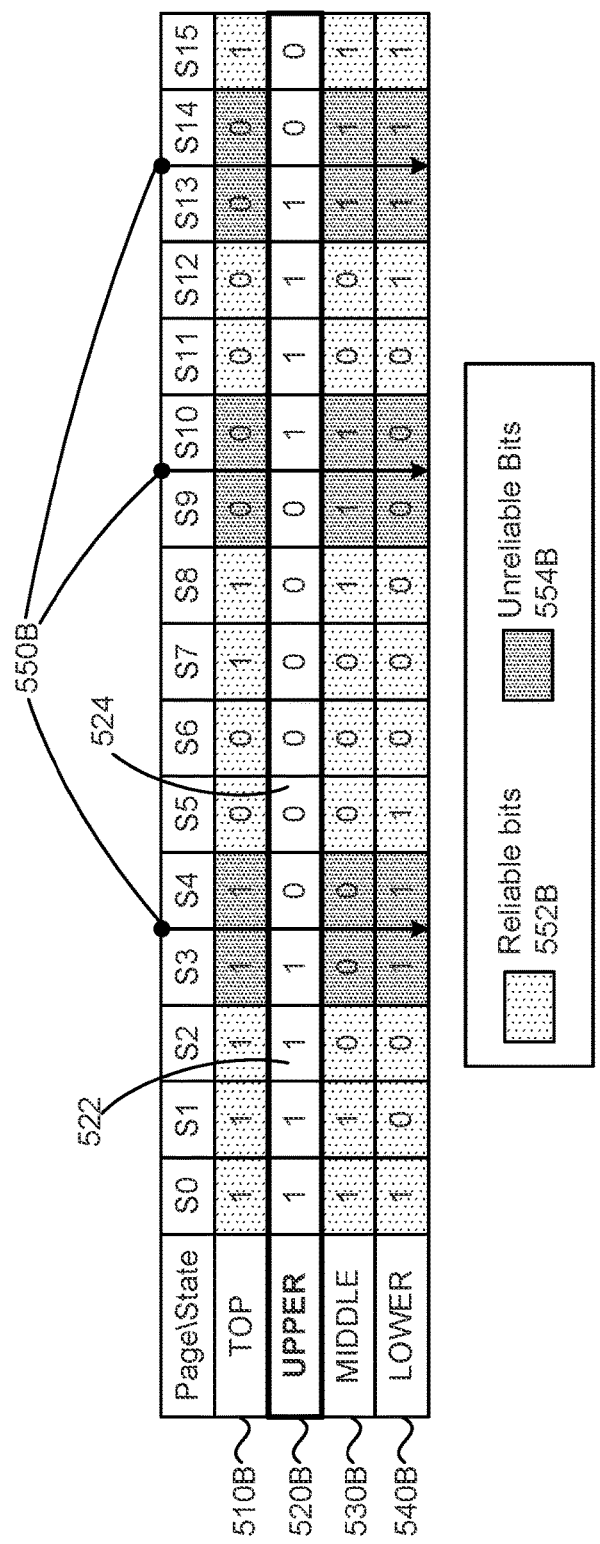
FIG. 5B depicts an example upper page read state, according to some arrangements.

FIG. 5B depicts an example upper page read state, in accordance with present implementations. As illustrated by way of example in FIG. 5B, an example upper page read state 500B can include at least a top page in the read state 510B, an upper page in the read state 520B, a middle page in the read state 530B, a lower page in the read state 540B, and voltage thresholds 550B in the read state 500B.

The upper page 520B can include a plurality of bits each having a corresponding bit value at respective bit index positions in a cell, vector, or row corresponding to the upper page 520B. The upper page 520B in read state 500B can be read in a read operation corresponding to the upper page 520B, via the voltage thresholds 550B. The top page 510B can include a plurality of bits each having a corresponding bit value at respective bit index positions in a cell, vector, or row corresponding to the top page 510B. The middle page 530B can include a plurality of bits each having a corresponding bit value at respective bit index positions in a cell, vector, or row corresponding to the middle page 530B. The lower page 540B can include a plurality of bits each having a corresponding bit value at respective bit index positions in a cell, vector, or row corresponding to the lower page 540B.

The plurality of bits of the top page 510B, middle page 530B and lower page 540B can each have a reliability characteristic dependent on the number of bit positions each bit is from a voltage threshold among the voltage thresholds 550B. For example, each bit of the plurality of bits of the top page 510B, middle page 530B and lower page 540B in an index adjacent to a voltage threshold among the voltage thresholds 550B can have a reliability characteristic that indicates the bit is unreliable. For example, each bit of the plurality of bits of the top page 510B, middle page 530B and lower page 540B in an index not adjacent to a voltage threshold among the voltage thresholds 550B can have a reliability characteristic that indicates the particular bit is reliable. For example, bits of the top page 510B, middle page 530B and lower page 540B at indices S0, S1, S2, S5, S6, S7, S8, S11, S12 and S15 in the read state 500B can be reliable. For example, bits of the top page 510B, middle page 530B and lower page 540B at indices S3, S4, S9, S10, S13 and S14 in the read state 500B can be unreliable.

The voltage thresholds 550B can correspond at least partially in one or more of structure and operation to one or more of the thresholds 301-315, modulated in accordance with read state 500B. The read state 500B can include three voltage thresholds 550B adjacent to 6-bit indices of the 16-bit indices of the memory block. Thus, the upper page 520B in the read state 500B, with 6 reliable bits among 16 total bits, can correspond to a state having a 62.5% reliable bit state.

Figure 5C:
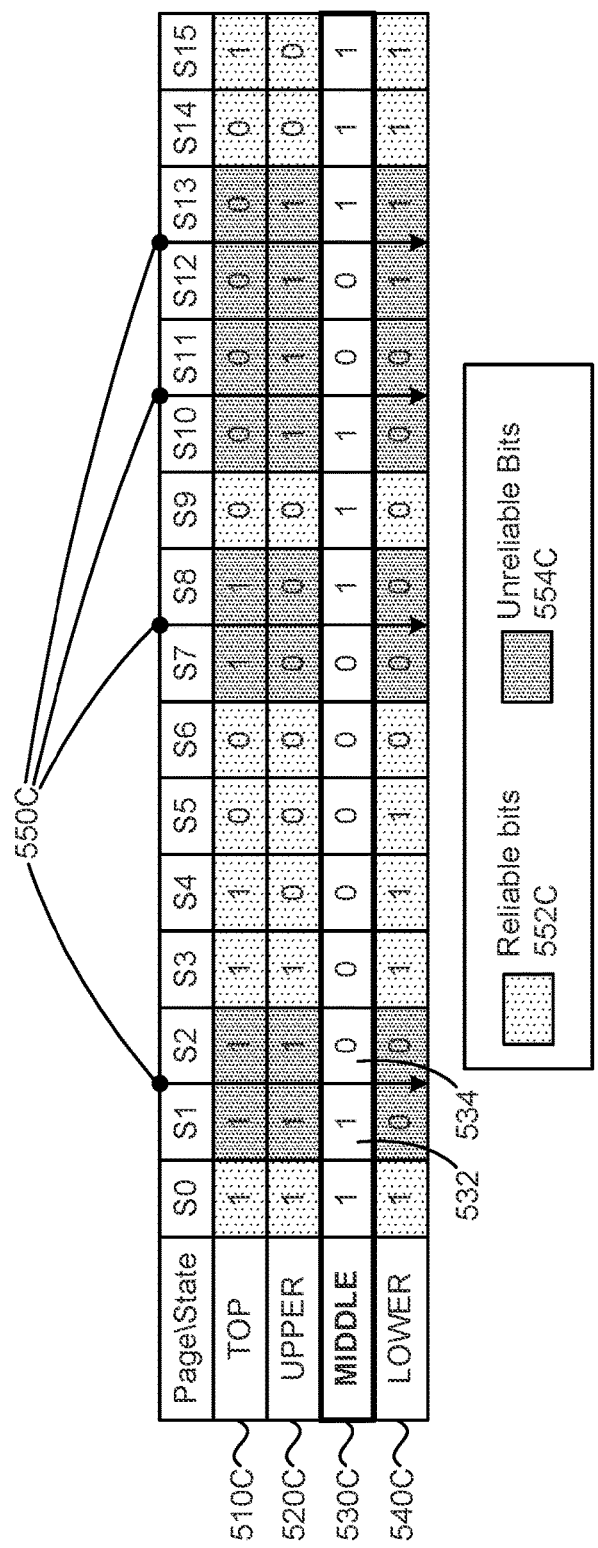
FIG. 5C depicts an example middle page read state, according to some arrangements.

FIG. 5C depicts an example middle page read state, in accordance with present implementations. As illustrated by way of example in FIG. 5C, an example middle page read state 500C can include at least a top page 510C in the read state 500C, an upper page 520C in the read state 500C, a middle page 530C in the read state 500C, a lower page 540C in the read state 500C, and voltage thresholds 550C in read state 500C.

The middle page 530C can include a plurality of bits each having a corresponding bit value at respective bit index positions in a cell, vector, or row corresponding to the middle page 530C. The middle page 530C in the read state 500B can be read in a read operation corresponding to the middle page 530C, via the voltage thresholds 550C. The top page 510C can include a plurality of bits each having a corresponding bit value at respective bit index positions in a cell, vector, or row corresponding to the top page 510C. The upper page 520C can include a plurality of bits each having a corresponding bit value at respective bit index positions in a cell, vector, or row corresponding to the upper page 520C. The lower page 540C can include a plurality of bits each having a corresponding bit value at respective bit index positions in a cell, vector, or row corresponding to the lower page 540C.

The plurality of bits of the top page 510C, upper page 520C and lower page 540C can each have a reliability characteristic dependent on the number of bit positions each bit is from a voltage threshold among the voltage thresholds 550C. For example, each bit of the plurality of bits of the top page 510C, upper page 520C and lower page 540C in an index adjacent to a voltage threshold among the voltage thresholds 550C can have a reliability characteristic that indicates the particular bit is unreliable. For example, each bit of the plurality of bits of the top page 510C, upper page 520C and lower page 540C in an index not adjacent to a voltage threshold among the voltage thresholds 550C can have a reliability characteristic that indicates the particular is reliable. For example, bits of the top page 510C, upper page 520C and lower page 540C at indices S0, S3, S4, S5, S6, S9, S14 and S15 in the read state 500C can be reliable. For example, bits of the top page 510C, upper page 520C and lower page 540C at indices S1, S2, S7, S8, S10, S11, S12 an S13 in the read state 500C can be unreliable.

The voltage thresholds 550C can correspond at least partially in one or more of structure and operation to one or more of the thresholds 301-315, modulated in accordance with read state 500C. The read state 500C can include four voltage thresholds 550C adjacent to 8-bit indices of the 16-bit indices of the memory block. Thus, the middle page 530C in the read state 500C, with 8 reliable bits among 16 total bits, can correspond to a state having a 50% reliable bit state.

Figure 5D:
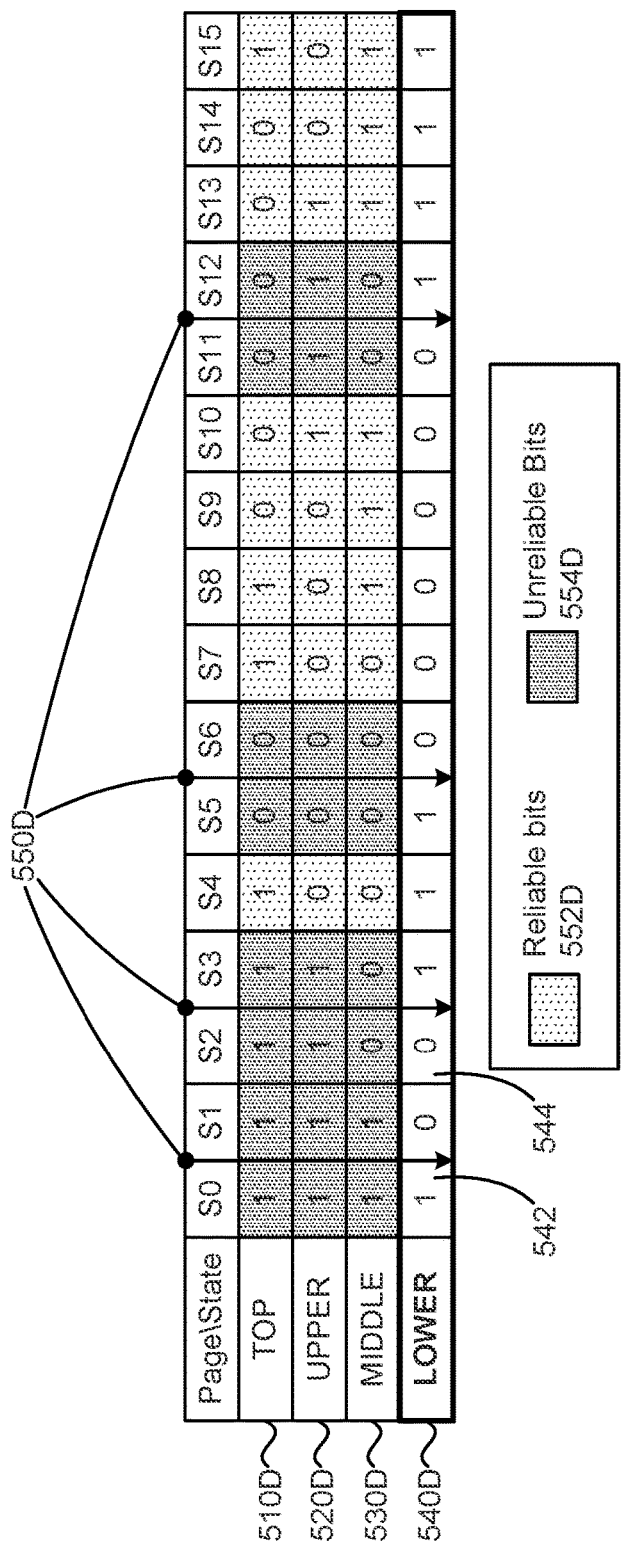
FIG. 5D depicts an example lower page read state, according to some arrangements.

FIG. 5D depicts an example lower page read state, in accordance with present implementations. As illustrated by way of example in FIG. 5D, an example lower page read state 500D can include at least a top page 510D in the read state 500D, an upper page 520D in the read state 500D, a middle page 530D in the read state 500D, a lower page 540D in the read state 500D, and voltage thresholds 550D in the read state 500D.

The lower page 540D can include a plurality of bits each having a corresponding bit value at respective bit index positions in a cell, vector, or row corresponding to the lower page 540D. The lower page 540D in read state 500D can be read in a read operation corresponding to the lower page 540D, via the voltage thresholds 550D. The top page 510D can include a plurality of bits each having a corresponding bit value at respective bit index positions in a cell, vector, or row corresponding to the top page 510D. The upper page 520D can include a plurality of bits each having a corresponding bit value at respective bit index positions in a cell, vector, or row corresponding to the upper page 520D. The middle page 530D can include a plurality of bits each having a corresponding bit value at respective bit index positions in a cell, vector, or row corresponding to the middle page 530D.

The plurality of bits of the top page 510D, the upper page 520D and the middle page 530D can each have a reliability characteristic dependent on the number of bit positions each bit is from a voltage threshold among the voltage thresholds 550D. For example, each bit of the plurality of bits of the top page 510D, the upper page 520D and the middle page 530D in an index adjacent to a voltage threshold among the voltage thresholds 550D can have a reliability characteristic that indicates the particular bit is unreliable. For example, each bit of the plurality of bits of the top page 510D, the upper page 520D and the middle page 530D in an index not adjacent to a voltage threshold among the voltage thresholds 550D can have a reliability characteristic that indicates the particular is reliable. For example, bits of the top page 510D, the upper page 520D and the middle page 530D at indices S4, S7, S8, S9, S10, S13, S14 and S15 in the read state 500D can be reliable. For example, bits of the top page 510D, the upper page 520D and the middle page 530D at indices S0, S1, S2, S3, S5, S6, S11 and S12 in the read state 500D can be unreliable.

The voltage thresholds 550D can correspond at least partially in one or more of structure and operation to one or more of the thresholds 301-315, modulated in accordance with read state 500A. The read state 500D can include four voltage thresholds 550A adjacent to 8-bit indices of the 16-bit indices of the memory block. Thus, the lower page 540D in the read state 500D, with 8 reliable bits among 16 total bits, can correspond to a state having a 50% reliable bit state.

FIGS. 6A-D are directed to example bit reliability matrices based on the reliability characteristics respectively described in FIGS. 5A-D. The controller 200 can store one or more reliability matrices, one or more reliability vectors, or any combination thereof. For example, the controller 200 can store one or more reliability matrices, one or more reliability vectors as at least a portion of the programming parameters 220. For example, the controller 220 can identify whether a bit at a particular bit position is reliable by selecting or identifying a particular reliability matrix corresponding to a particular read state. The controller 220 can identify whether a bit at a particular bit position is reliable by, for example, identifying a bit position in the reliability matrix base don one or more of the bit position for that bit, one or more of the bits of the extrinsic pages to the page in the read state, or any combination thereof.

FIG. 6A depicts an example bit reliability matrix for top page, in accordance with present implementations. As illustrated by way of example in FIG. 6A, an example bit reliability matrix 600A for the top page 510 can include at least a top page reliability vector 610A. The bit reliability matrix 600A can include a plurality of rows, each having indices corresponding to the indices of the memory block having the top page read state 500A. The top page reliability vector 610A can include a row of bits each having a value indicating a binary value and associated with a particular index of the memory block in the top page read state 500A. The binary value can indicate whether a bit at a particular bit position in the top page read state 500A is reliable. For example, the top page reliability vector 610A can include a plurality of reliable bit indication bits 612A each having a binary value of 1 that indicates that bits at those positions are reliable. For example, the top page reliability vector 610A can include a plurality of unreliable bit indication bits 614A each having a binary value of zero that indicates that bits at those positions are unreliable. The reliable bit indication bits 612A and the unreliable bit indication bits 614A can respectively indicate reliability and unreliability of bits at bit positions S0-S15, corresponding to reliable and unreliable bits of the top page read state 500A. The top page reliability vector 610A can correlate the reliable bit indication bits 612A and the unreliable bit indication bits 614A with bits of one or more of the upper page 510, the middle page 520, and the lower page 540.

FIG. 6B depicts an example bit reliability matrix for upper page, in accordance with present implementations. As illustrated by way of example in FIG. 6B, an example bit reliability matrix for upper page 600B can include at least an upper page reliability vector 610B. The bit reliability matrix 600B can include a plurality of rows, each having indices corresponding to the indices of the memory block having the upper page read state 500B. The upper page reliability vector 610B can include a row of bits each having a value indicating a binary value and associated with a particular index of the memory block in the upper page read state 500B. The binary value can indicate whether a bit at a particular bit position in the upper page read state 500B is reliable. For example, the upper page reliability vector 610B can include a plurality of reliable bit indication bits 612B each having a binary value of 1 that indicates that bits at those positions are reliable. For example, the top page reliability vector 610B can include a plurality of unreliable bit indication bits 614B each having a binary value of zero that indicates that bits at those positions are unreliable. The reliable bit indication bits 612B and the unreliable bit indication bits 614B can respectively indicate reliability and unreliability of bits at bit positions S0-S15, corresponding to reliable and unreliable bits of the upper page read state 500B.

FIG. 6C depicts an example bit reliability matrix for middle page, in accordance with present implementations. As illustrated by way of example in FIG. 6C, an example bit reliability matrix for middle page 600C can include at least a middle page reliability vector 610C. The bit reliability matrix 600C can include a plurality of rows, each having indices corresponding to the indices of the memory block having the middle page read state 500C. The middle page reliability vector 610C can include a row of bits each having a value indicating a binary value and associated with a particular index of the memory block in the middle page read state 500C. The binary value can indicate whether a bit at a particular bit position in the middle page read state 500C reliable. For example, the middle page reliability vector 610C can include a plurality of reliable bit indication bits 612C each having a binary value of 1 that indicates that bits at those positions are reliable. For example, the middle page reliability vector 610C can include a plurality of unreliable bit indication bits 614C each having a binary value of zero that indicates that bits at those positions are unreliable. The reliable bit indication bits 612C and the unreliable bit indication bits 614C can respectively indicate reliability and unreliability of bits at bit positions S0-S15, corresponding to reliable and unreliable bits of the upper page read state 500C.

FIG. 6D depicts an example bit reliability matrix for lower page, in accordance with present implementations. As illustrated by way of example in FIG. 6D, an example bit reliability matrix for lower page 600D can include at least a lower page reliability vector 610D. The bit reliability matrix 600D can include a plurality of rows, each having indices corresponding to the indices of the memory block having the lower page read state 500D. The lower page reliability vector 610D can include a row of bits each having a value indicating a binary value and associated with a particular index of the memory block in the lower page read state 500D. The binary value can indicate whether a bit at a particular bit position in the lower page read state 500D is reliable. For example, the lower page reliability vector 610D can include a plurality of reliable bit indication bits 612D each having a binary value of 1 that indicates that bits at those positions are reliable. For example, the lower page reliability vector 610D can include a plurality of unreliable bit indication bits 614D each having a binary value of zero that indicates that bits at those positions are unreliable. The reliable bit indication bits 612D and the unreliable bit indication bits 614D can respectively indicate reliability and unreliability of bits at bit positions S0-S15, corresponding to reliable and unreliable bits of the upper page read state 500D.

Figure 7:
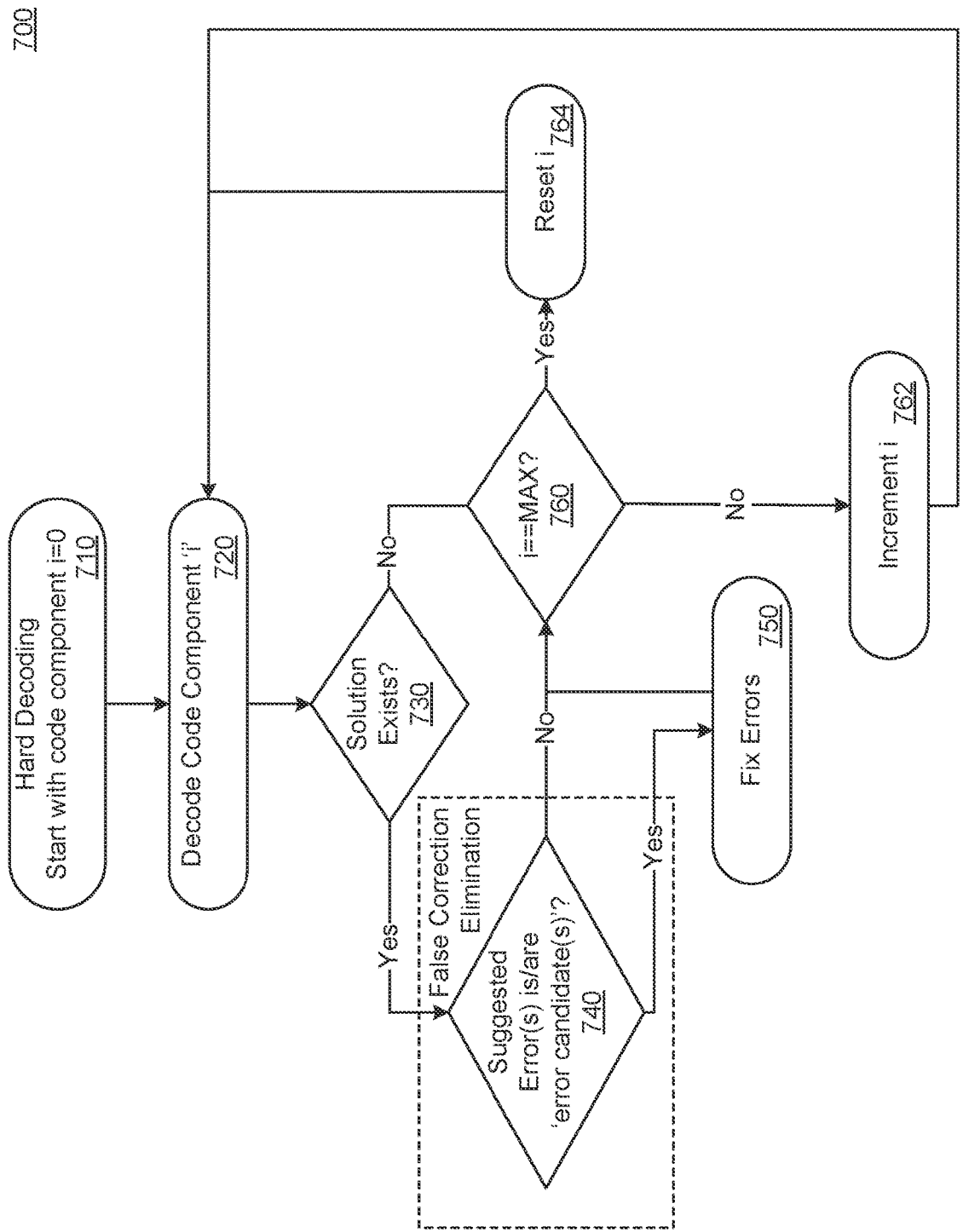
FIG. 7 depicts an example method of hard decoding code components, according to some arrangements.

FIG. 7 depicts an example method of hard decoding code components, in accordance with present implementations. At least the controller 202 can perform method 700. The hard-decoding process may use extrinsic-page information in order to reduce false-correction. For example, during the decoding process, if a 'reliable bit' is suggested to be fixed, this suggestion may be rejected and the suggested solution may be associated to be a false-correction. For example, in a NAND controller, an ECC can be based on turbo-codes. A turbo codes structure can include multiple code components. During the hard-decoding process, the code components can be iteratively evaluated and each code component can be decoded separately. In response to determination that a solution for a single code component includes at least one 'reliable bit', the solution is rejected. For example, a turbo code can include multiple code components where the error correction capability of each component is $t=(D_{min}-1)/2$, and a solution with up to 't' errors can be set. For example, the solution can be considered to be a false correction, and none of the suggested errors will be fixed, in response to a determination that at least one of the errors are 'reliable bit' according to one or more of the matrices 600A-D. This technical solution is not limited to the number of bits corrected or rejected for correction discussed herein by way of example, and can include correction at a solution level or bit level. The solution-level or bit-level correction can include correcting one or more bits of a page of a memory row, and can include correcting bits corresponding to one or more reliable bits or one or more error bits.

At 710, the method 700 can start hard decoding at first index. At 720, the method 700 can decode code component at index. At 730, the method 700 can determine whether solution exists for code component at index. At 740, the method 700 can determine if at least one suggested error corresponds to at least one reliable bit, if a solution exists. At 750, the method 700 can fix one or more errors in the code component.

At 760, the method 700 can determine if a current index corresponds to a maximum index for code components in a group. At 762, the method 700 can increment the index, if the current index does not correspond to the maximum index. At 764, the method 700 can reset the index, if the current index corresponds to the maximum index.

The technical solution of extended hard decoding can provide at least a technical improvement to error correction capability of a memory device. Extended decoding improves hard decoding capability, as false corrections are eliminated during hard decoding flow. Error floor decoding features are specific features that are performed as a last option when operations applied during a decoding flow exhibit no progress or insufficient correction. Error floor decoding flows can be based on (t+1) error fix. For example, t+1 can activate a last option in a decoding phase in which it is possible to fix 't' errors per code component. An error floor decoding flows based on (t+1) error fix can include one or more of the following actions. The process can map bits that have a higher probability to be erroneous (e.g., bits that belong to 2 unsolved code components). The process can emulate a fix (bit flip) over one or more bits that mapped previously. The process can attempt to solve the code components (try to fix 't' errors).

During this flow, a decoding operation is performed multiple times, each time based on a different hypothesis (with a different bit flip combination). As a result from this trial-and-error method, the probability to false correction event is increased. Using extended-HB-Decoding during error flow can thus reduce the probability of a false correction event, because a false correction event can be identified and rejected when at least one of the solution bits, or the enumerated bit-flip is associated with 'reliable bit' as discussed herein. As a result, the false correction probability is reduced, and the error floor flows are more effective.

Figure 8:
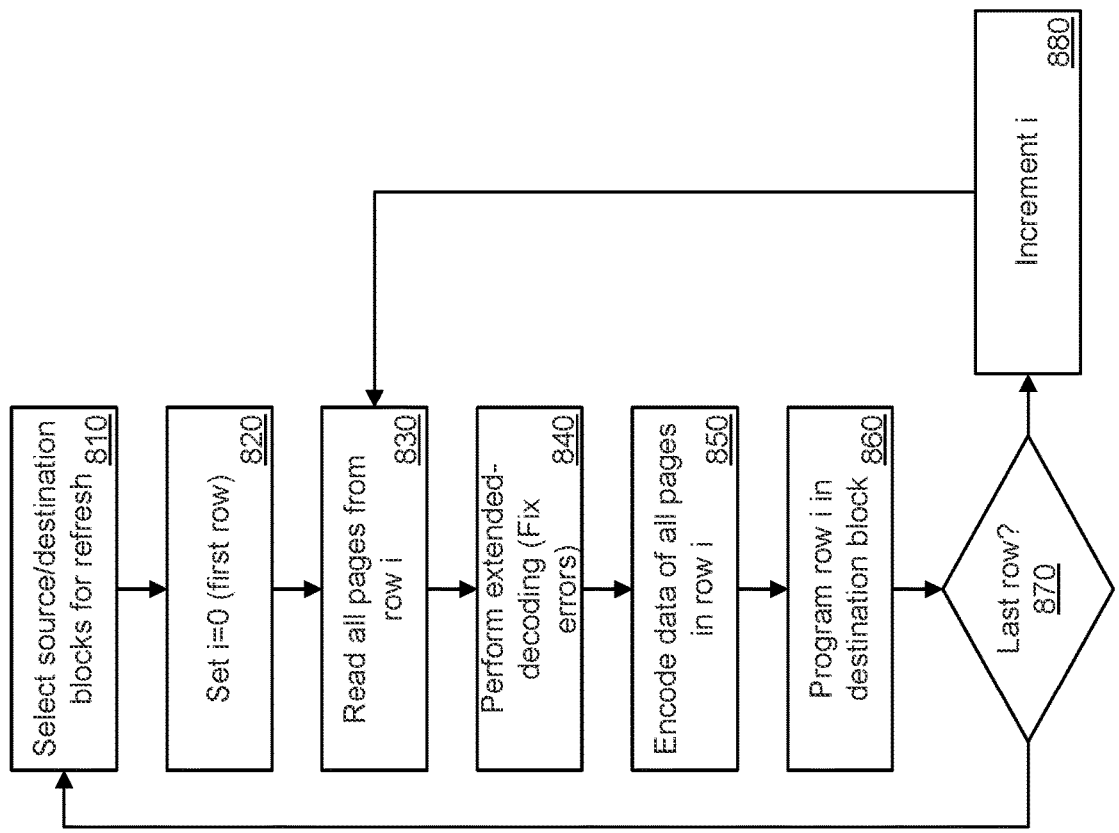
FIG. 8 depicts an example method of refreshing memory block with hard decoding, according to some arrangements.

FIG. 8 depicts an example method of refreshing memory block with hard decoding, in accordance with present implementations. At least the controller 202 can perform method 800.

Extrinsic-page information can improve error correction capability and reduce decoding latency. In order to generate the extrinsic-page information, a NAND read operation at read thresholds 550A-D can be performed, and data of pages in the same row cab be buffered. The latency of reading other pages in same row may impact on system performance. In this technical solution, the memory controller can buffer data to generate the extrinsic-page information with the read operation and can be utilized to generate the extrinsic information with no additional latency. Various system flows can run in the background, like read-threshold-tracking, refreshing, patrol read or garbage-collection. In these flows, the read order need not be defined by host (e.g., there are no read ordering constraints from host), and thus it is more simple to plan a flow in which extended-decoding can be performed with no additional NAND-read. In NAND memory, the number of errors can increase over time. When the host reads data from flash, the data may include some errors due to reading with non-optimal thresholds or following retention/read-disturb stresses. When host accesses data in NAND with high BER, a high complexity (and high latency) decoding can be required to overcome high BER.

A patrol read is a background operation in memory controller that maintains a relatively low BER is system. For example, the patrol read can detect in advance a block with high BER. The patrol read can perform read-threshold-tracking operations. Here, high BER can be effectively reduced by optimizing read-thresholds. The patrol read can perform a refresh operation, in response to detection by the controller that BER is too high and block should be re-programmed in order to reduce BER effectively. Thus, the patrol read can maintain low read-BER when the host accesses data, so the latency of functional reads (by host) will be low.

An example to read-threshold-background-tracking process can include one or more of the following action. The tracking process can select a specific block/row for test. The tracking process can read one or more pages from the selected row, and buffer the row-data. The tracking process can decode (fix) all pages and buffer the fixed data. The tracking process can estimate optimal read-thresholds according to original read-thresholds, row-data, fixed-data. For example, the memory controller can decide to refresh a block in order to extend system lifetime. During the refresh process, a full block is copied to a new block. For example, all pages from original block are read, decoded, and programmed into a new erased block. In refresh flows, the BER of the original block is naturally high, thus the gain of extended decoding is desired.

An example refresh flow for a given block can include one or more of the following actions. However, the flow is not limited to the examples discussed herein, and can vary based at least on a type or instance of flash device due to per-NAND-flash-specific programing optimization. The refresh process can, for each row in a given block, read all pages of row (i) from source block, Buffer data from all pages of row(i), decode and fix data from all pages of row (i) re-encode all pages of row (i), and write all pages of row (i) to destination block. An example refresh flow for a given block using extended decoding can include one or more of the following actions. The refresh process can, for each row in a given block, read all pages of row (i) from a source block, buffer data from all pages of row(i), perform extended decoding, and fix data from all pages of row (i) with no additional NAND reads, since the data is already buffered). The refresh process can re-encode all pages of row (i), and write all pages of row (i) to destination block.

At 810, the method 800 can select one or more source or destination blocks to refresh. At 820, the method 800 can initialize an index. At 830, the method 800 can read all pages of a row of a memory block corresponding to the index. At 840, the method 800 can fix one or more errors by extended decoding. At 850, the method 800 can encode data of one or more pages of the memory block corresponding to the index. At 860, the method 800 can program or store the row at the destination block. At 870, the method 800 can determine whether the row at the current index corresponds to a last row of the memory block. At 880, the method 800 can increment the index, if the row at the current index does not correspond to the last row of the memory block.

Figure 9:
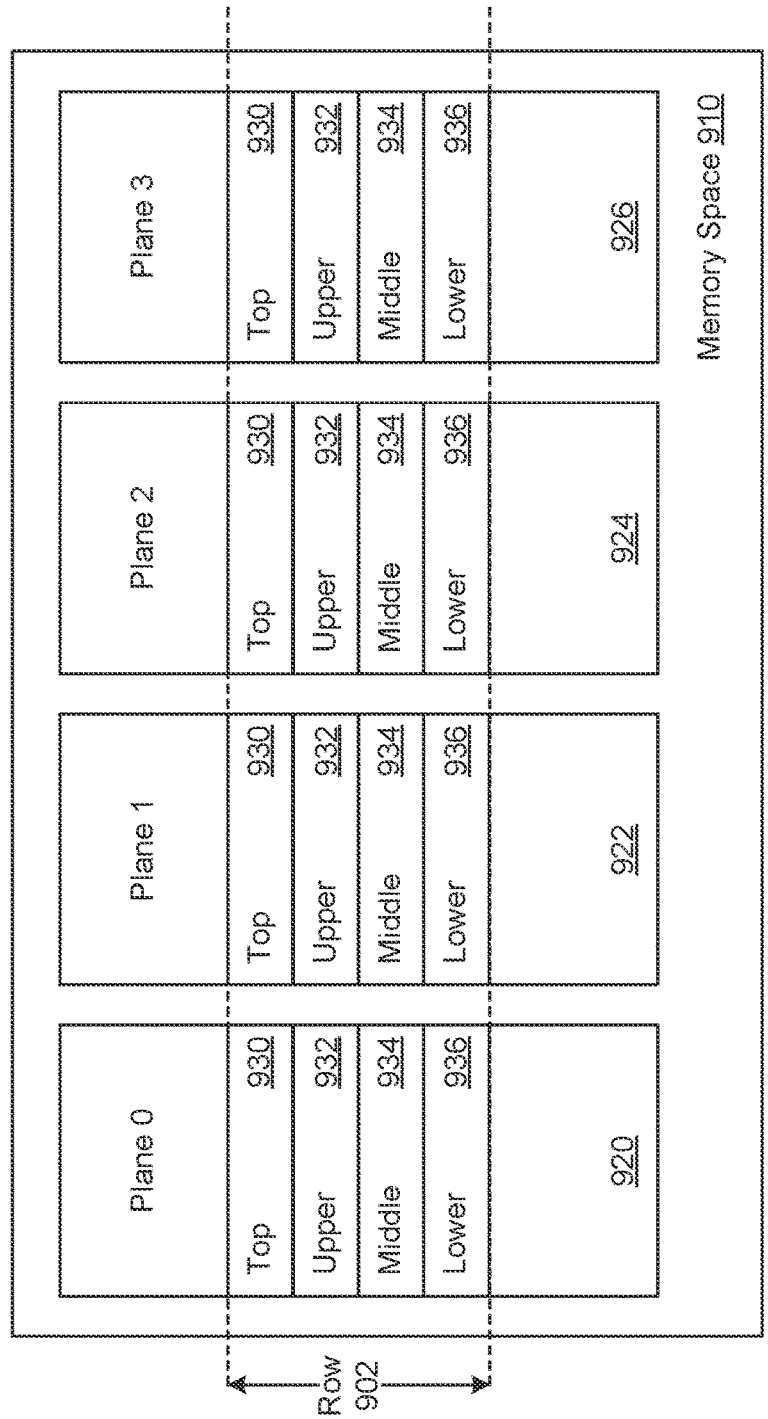
FIG. 9 depicts an example memory block, according to some arrangements.

FIG. 9 depicts an example memory block, in accordance with present implementations. As illustrated by way of example in FIG. 9, an example memory block 900 can include at least a memory space 910, memory planes 920, 922, 924 and 926, and one or more rows 902, each including one or more memory pages 930, 932, 934 and 936. The row 902 can correspond at least partially in one or more of structure and operation to one or more memory blocks according to the read states 500A-D.

The memory space 910 can include one or more memory locations, including one or more memory locations of a memory device as discussed herein. The memory space 910 can receive, store, and transmit one or more memory blocks in accordance with the memory blocks in one or more of the read states 500A-D. For example, the memory space 910 can receive one or more memory blocks in a serial or sequential order, and can store the memory blocks in a first-in-first-out (FIFO) queue. The memory space 910 can include one or more logical or electronic devices including but not limited to integrated circuits, logic gates, flip flops, gate arrays, programmable gate arrays, and the like. The memory planes 920, 922, 924 and 926 can each correspond to a distinct memory block having corresponding memory pages. Each of the memory planes 920, 922, 924 and 926 can store distinct or independent bit values corresponding to distinct or independent data stored or transmitted via a memory device. The memory pages 930, 932, 934 and 936 can correspond at least partially in one or more of structure and operation to the top, upper, middle and lower pages 510, 520, 530 and 540. For example, the memory pages 930, 932, 934 and 936 can each correspond to any of pages 510A-D, 520 A-D. 530 A-D and 540A-D of any of the read states 500A-D. Each of the memory pages 930, 932, 934 and 936 can include distinct or independent data at each of the memory planes 920, 922, 924 and 926. For example, binary data stored at the memory pages 930, 932, 934 and 936 of Plane 0 920 can differ from binary data stored at the memory pages 930, 932, 934 and 936 of Plane 1 922.

Figure 10A:
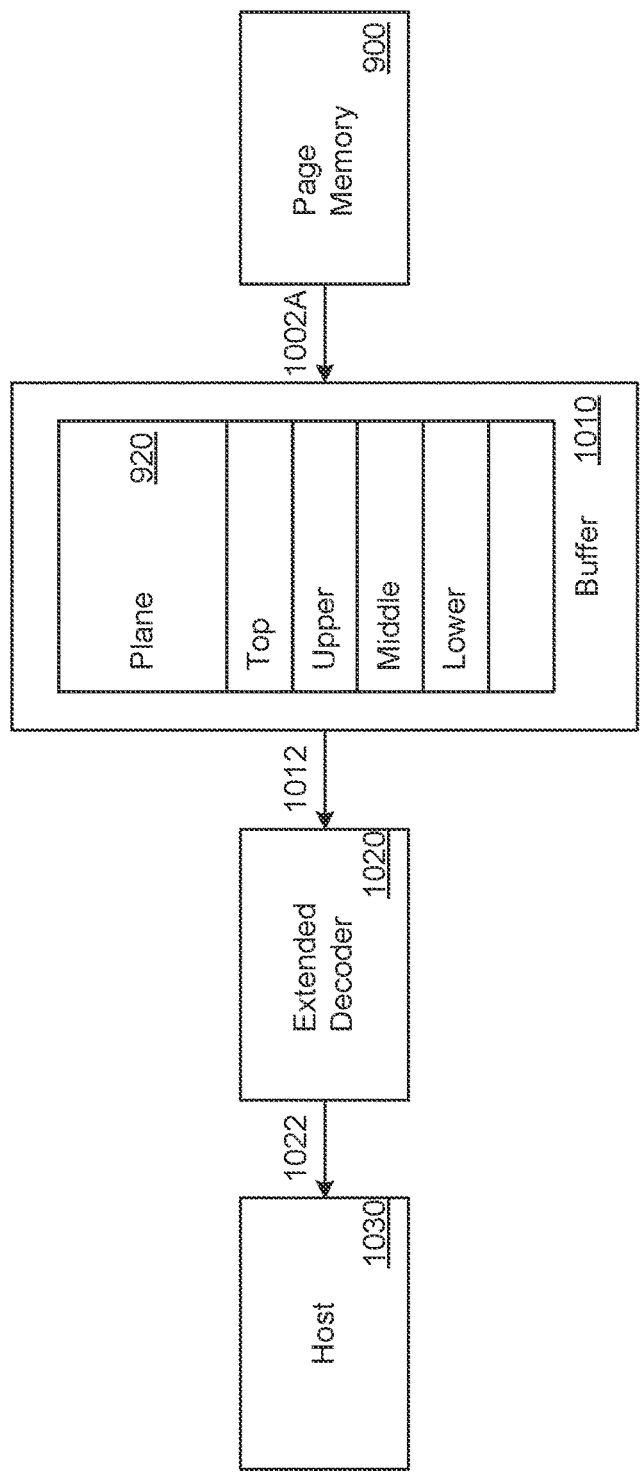
FIG. 10A depicts an example extended decoder architecture, according to some arrangements.

FIG. 10A depicts an example extended decoder architecture, in accordance with present implementations. As illustrated by way of example in FIG. 10A, an example extended decoder architecture 1000A can include at least a memory block transmission 1002A, a buffer memory 1010, an extended decoder 1020, and a host 1030. The extended decoder architecture 1000A can integrate with a buffer architecture to provide a technical improvement of performing extender decoder decoding on data buffered during a read operation, while applying read operations for read operations, and without introducing latency from read operations dedicated to extended decoding.

During sequential-read transactions, data from all pages in a row is read to host. Data from all pages of specific row can be read from flash and buffered. For example, buffered data can be passed through an extended decoder with extrinsic page information available from buffer. Subsequently, corrected or fixed data is moved to host. One or more portions of the architecture 1000A can be implemented in pipeline (code-word by codeword) in order to achieve a technical improvement of high read throughput.

The memory block transmission 1002A can transmit a plane from the page memory 900 to the buffer 1010. For example, the memory block transmission 1002A can include a transmission from the page memory 900 to the buffer 1010 in response to an instruction at the controller 202 to perform a read operation on the memory 204.

The buffer memory 1010 can include one or more memory locations, including one or more memory locations of a memory device as discussed herein. The buffer memory 1010 can receive, store, and transmit one or more memory blocks in accordance with the memory blocks in one or more of the read states 500A-D. For example, the buffer memory 1010 can receive one or more memory blocks in a serial or sequential order, and can store the memory blocks in a first-in-first-out (FIFO) queue. For example, the buffer memory can perform a buffer transmission 1012 in a FIFO order. The buffer memory 1010 can include one or more logical or electronic devices including but not limited to integrated circuits, logic gates, flip flops, gate arrays, programmable gate arrays, and the like. The buffer transmission 1012 can transmit a plane stored at the buffer or a copy of the plane stored at the buffer to the extended decoder 1020. For example, the buffer transmission 1012 can transmit one or more of memory planes 920, 922, 924 and 926 to the extended decoder 1020 in a FIFO order.

The extended decoder 1020 can identify one or more bits or one or more bit positions corresponding to particular bits to be decoded in accordance with an error correction process. For example, the extended decoder 1020 can identify a particular page of the plane 920. The extended decoder 1020 can identify bits, or bit positions corresponding to bits, having a high likelihood of error, based on a read state among the read states 500A-D corresponding to the page of the plane 920 being decoded by the extended decoder. The decoder can then perform decoding on the bits at bit positions corresponding to the unreliable bit indication bits 614, and can reject, forgo, defer, or block, for example, decoding of the bits at bit positions corresponding to the reliable bit indication bits 612.

This technical solution can provide at least an improvement of significant speed gains in error correction of memory devices. For example, an example code rate of may be used in a NAND memory controller. Here, R can equal 0.897, for 4112 Bytes for information data and 472 Bytes for redundancy data. For example, for a FER of $1 \times 10^{-3}$, technical improvement including at least the gain discussed below in Table 1 can be achieved.

TABLE 1

|  | FBC @FER <$1 \times 10^{-3}$ | Gain [%] |
|---|---|---|
| Hard decoding | 320 | — |
| Extended hard-decoding TLC (25% reliable bits) | 338 | 5.6 |
| Extended hard-decoding QLC (50% reliable bits) | 360 | 12.5 |

The extended decoder 1020 can perform an extended decoder transmission 1022. The extended decoder transmission 1022 can transmit a plane including one or more corrected or fixed bits corrected by the extended decoder 1020. For example, the extended decoder transmission 1022 can transmit the plane 920, subsequent to an error correction process performed by the extended decoder 1020 on the bit positions corresponding to the unreliable bit indication bits 614, for one or more pages of the plane 920. The host 1030 can correspond at least partially in one or more of structure and operation to the host 101. The host 1030 can obtain the extended decoder transmission 1022 including the plane having one or more bits corrected by the extended decoder 1020.

Figure 10B:
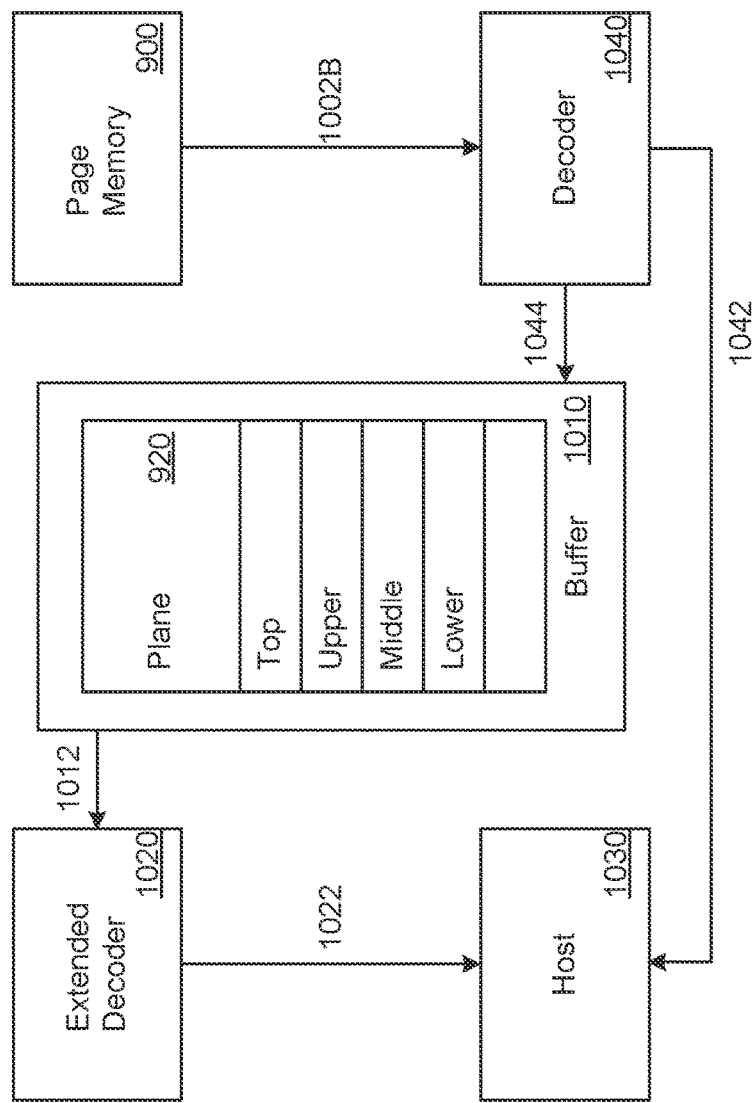
FIG. 10B depicts an example extended decoder architecture including preprocessing decoder, according to some arrangements.

FIG. 10B depicts an example extended decoder architecture including preprocessing decoder, in accordance with present implementations. As illustrated by way of example in FIG. 10B, an example extended decoder architecture including preprocessing decoder 1000B can include at least a memory block transmission 1002B, a decoder 1040, a decoder success transmission 1042, and a decoder secondary transmission 1044. The architecture 1000B may be used in systems sensitive to read latency. For example, data may be moved to host out-of-order (like SSD systems). Here, data can be streamed to the host as soon as possible (codeword by codeword) using normal-hard-decode and buffer the data.

Where a hard decode by a hard decoder fails, the extended decoder can perform an extended decode as soon as the extrinsic-page-information is available in the buffer. For example, data is read and decoded codeword-by-codeword, and data is moved to the host and buffered for future usage. For example, the data can be buffered in case extended-decode is needed upon normal-decode failure. In case of normal-decode failure, extended decoding is performed once all the data that is needed for extrinsic-page-information is available in the buffer. One or more portions of the architecture 1000B can be implemented in pipeline (code-word by codeword) in order to achieve a technical improvement of high read throughput.

The memory block transmission 1002B can transmit a plane from the page memory 900 to the hard decoder 1040. For example, the memory block transmission 1002B can include a transmission from the page memory 900 to the hard decoder 1040 in response to an instruction at the controller 202 to perform a read operation on the memory 204.

The decoder 1040 can identify one or more bits or one or more bit positions corresponding to particular bits to be decoded in accordance with an error correction process distinct from that of the extended decoder 1020. For example, the decoder 1040 can identify a particular page of the plane 920. The decoder 1040 can perform decoding on bits at all or a predetermined subset of bit positions independent of the unreliable bit indication bits 614. For example, the decoder 1040 can perform an error correction operation on one or more code components or codewords having a correction rate lower than that of the extended decoder 1020.

The decoder 1040 can perform a decoder success transmission 1042. The decoder success transmission 1042 can transmit a plane including one or more corrected or fixed bits corrected by the decoder 1040. For example, the decoder 1040 can transmit the plane 920, subsequent to an error correction process performed by the decoder 1040 on all bit positions of the plane 920, for one or more pages of the plane 920. The decoder 1040 can perform a decoder secondary transmission 1044. The decoder secondary transmission 1044 can transmit a plane to the buffer 1010, after an unsuccessful attempt by the decoder 1040 to correct bits of the plane sufficient to satisfy the correction threshold. For example, the decoder secondary transmission 1044 can transmit the plane 920, subsequent to an error correction process performed by decoder 1040 that indicates a BER greater than a threshold BER as discussed herein. The extended decoder 1020 can perform a correction only on those planes transmitted by the decoder 1040 to the buffer 1010.

Figure 11A:
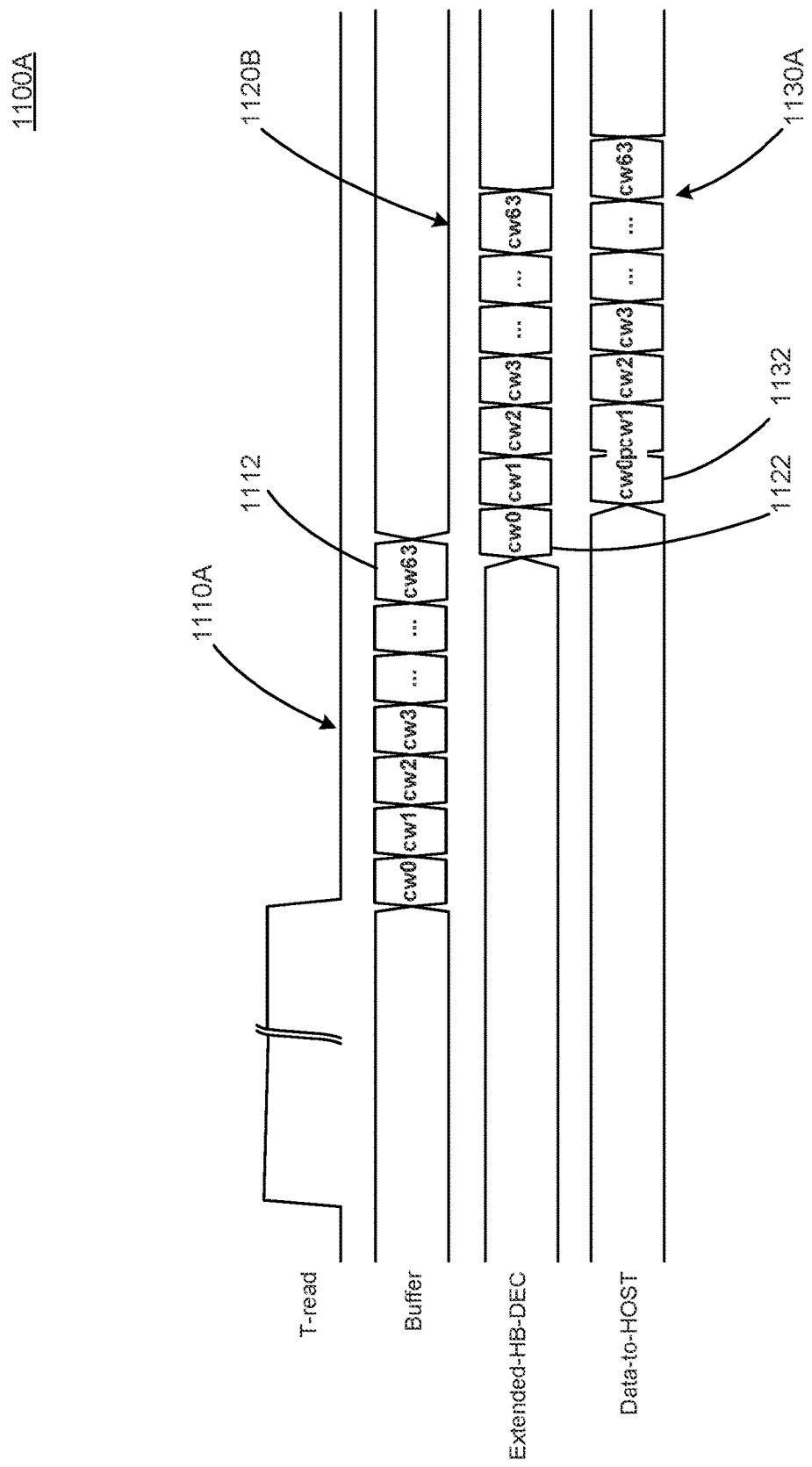
FIG. 11A depicts an example timing diagram of codeword transmission via an extended decoder, according to some arrangements.

FIG. 11A depicts an example timing diagram of codeword transmission via an extended decoder, in accordance with present implementations. As illustrated by way of example in FIG. 11A, an example timing diagram 1100A of codeword transmission via an extended decoder can include at least a codeword transmission via buffer 1110A, a codeword transmission via extended decoder 1120A, and a codeword transmission to host 1130A.

The timing diagram 1100A can correspond to the operation of the architecture 1000A. The architecture 1000A is not limited to operation in accordance with the example timing diagram 1100A. In the example timing diagram 1100A, all codewords can be transmitted via the codeword transmission 1110A to the buffer 1010 before transmission to the extended decoder 1040. Codewords at the extended decoder 1040 can be transmitted to the host 1030, for example, one cycle after being received at the extended decoder 1020.

The codeword transmission 1110A via the buffer 1010 can include a serial transmission of one or more codewords in a particular order. The codeword transmission 1110A can receive one or more codewords corresponding to or including one or more planes in a FIFO order. The buffer 1010 can receive all codewords before starting to transmit codewords to the extended decoder 1020. The codeword transmission 1120A via the extended decoder 1020 can include a serial transmission of one or more codewords in order according to the FIFO order of the codeword transmission 1110A. The codeword transmission 1120A can receive one or more codewords corresponding to or including one or more planes in a FIFO order. The extended decoder 1020 can transmit a codeword from the extended decoder 1020 before receiving all codewords the extended decoder 1020. For example, the extended decoder 1020 can begin transmitting codewords after receiving the last codeword 1112 of the codeword transmission 1110A. For example, the extended decoder 1020 can begin transmitting codewords to the host 1030 before receiving all codewords of the codeword transmission 1120A.

The codeword transmission 1130A to the host 1030 can include a serial transmission of one or more codewords in order according to the FIFO order of the codeword transmission 1110A. The codeword transmission 1130A can receive one or more codewords corresponding to or including one or more planes in a FIFO order. The extended decoder 1020 can transmit a codeword from the extended decoder 1020 to the host 1030 before receiving all codewords the extended decoder 1020. For example, the extended decoder 1020 can begin transmitting codewords to the host 1030 after each codeword is received at the extended decoder 1020, and concurrently with or before the next codeword is received at the extended decoder 1020 via the codeword transmission 1120A.

Figure 11B:
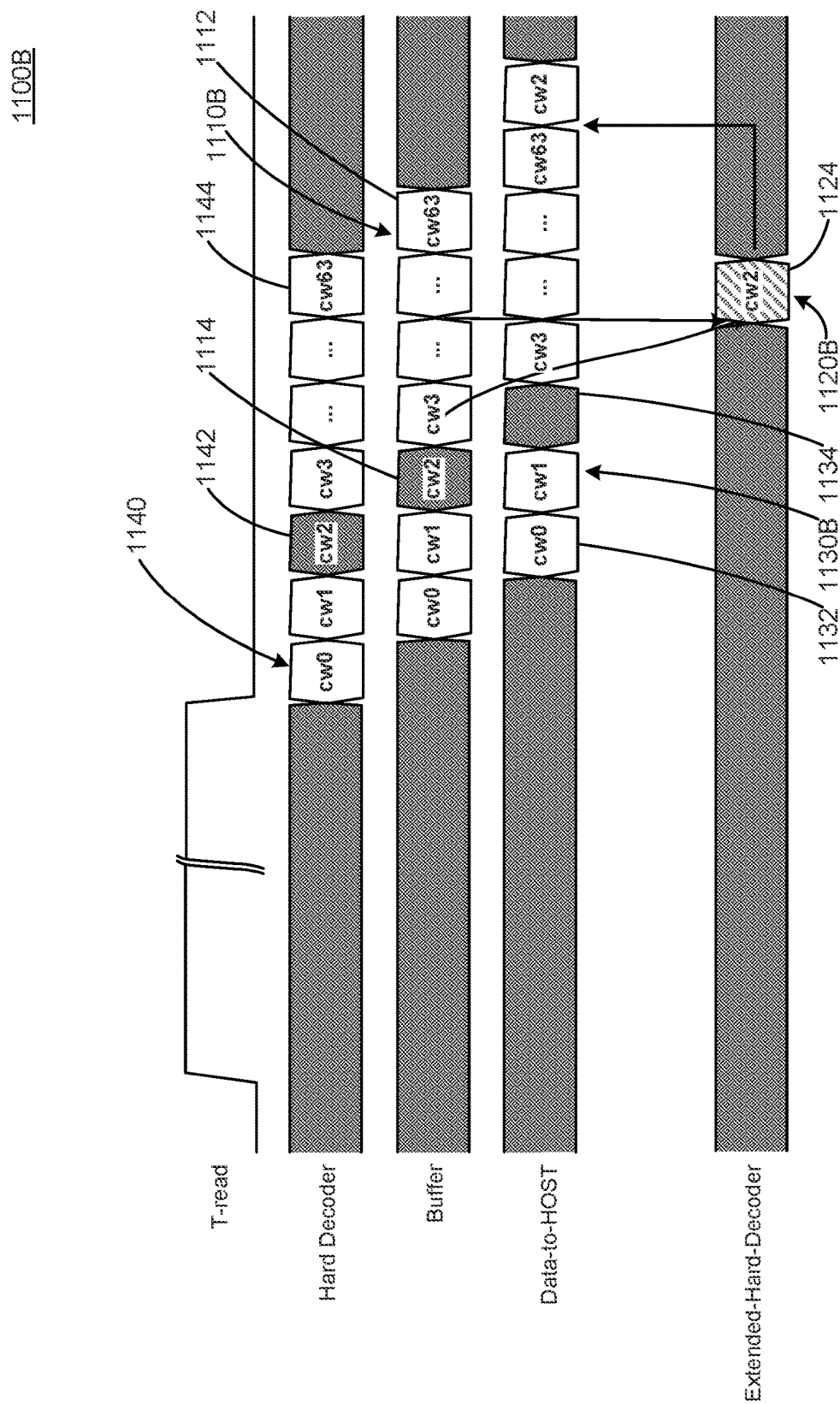
FIG. 11B depicts an example timing diagram of codeword transmission via a hard decoder and an extended decoder, according to some arrangements.

FIG. 11B depicts an example timing diagram of codeword transmission via a hard decoder and an extended decoder, in accordance with present implementations. As illustrated by way of example in FIG. 11B, an example timing diagram of codeword transmission via a hard decoder and an extended decoder 1100B can include at least a codeword transmission via buffer 1110B, a codeword transmission via extended decoder 1120B, a codeword transmission to host 1130B, and a codeword transmission via hard decoder 1140.

The timing diagram 1100B can correspond to the operation of the architecture 1000B. The architecture 1000B is not limited to operation in accordance with the example timing diagram 1100B. The timing diagram 1100B can thus correspond to an example of operation of the architecture 1000B in a streaming mode, in which all codewords that are correct are transmitted as they are received, and codewords that are selected for correction by the extended decoder 1020 are transmitted subsequent to transmission of correct packets. Thus, the timing diagram 1100B provides a technical solution of operation of the architecture 1000B, and provides a technical improvement by at least that technical solution to provided low-latency error correction of memory device data.

In the example timing diagram 1100B, codewords can be transmitted via the codeword transmission 1140 from the hard decoder 1040 to the buffer 1010. Codewords can be transmitted in a FIFO order before all codewords are received at the hard decoder 1040. For example, codewords can be transmitted from the hard decoder 1040 to the one cycle after being received at the hard decoder 1040. The codeword transmission 1140 via hard decoder 1040 can include an error codeword 1142, and a last codeword 1144. The error codeword 1142 can correspond to a codeword having an error that is not corrected or cannot be corrected by the hard decoder 1040. The hard decoder 1040 can then determine to transmit the error codeword 1142 to the buffer 1010. For example, the hard decoder 1040 can transmit the error codeword 1142 to the buffer 1010 with an indication of an error state of the error codeword 1142.

The codeword transmission via buffer 1110B can include a serial transmission of one or more codewords in the FIFO order. The codeword transmission 1110B can receive one or more codewords corresponding to or including one or more planes in a FIFO order. The buffer 1010 can receive all codewords error codeword 1142. The codeword transmission 1120B via the extended decoder 1020 can include a serial transmission of one or more error codewords in the FIFO order. The codeword transmission 1120B can include the error codeword 1142, and can include any number of error codewords and can exclude one or more codewords corrected by the hard decoder 1040.

The codeword transmission 1130B to the host 1030 can include a serial transmission of one or more first codewords in a first FIFO order and one or more second codewords in a second FIFO order. For example, the first codewords can correspond to codewords corrected by the hard decoder 1040 and transmitted to the host 1030. The first FIFO order can correspond to a FIFO order for a queue of the first codewords excluding the second codewords. For example, the second codewords can correspond to codewords corrected by the extended decoder 1020 and transmitted to the host 1030. The second FIFO order can correspond to a FIFO order for a queue of second first codewords excluding the first codewords, and can be transmitted after completion of the transmission of the codewords of the first FIFO order or completion of transmission of all first codewords. The error transmission gap 1134 can correspond to a portion of the codeword transmission 1130B to the host 1030 not including a codeword. The codeword transmission 1130B to the host 1030 can include the error transmission gap 1134 to provide a technical improvement of maintaining stream transmission of codewords while preventing halting or slowing of stream transmission of codewords transmitted without error correction by the extended decoder 1040. The last codeword transmission 1144 via hard decoder 1040 can occur before transmission of the corrected error codeword 1124 to the host 1030 by the codeword transmission 1130B.

Figure 12:
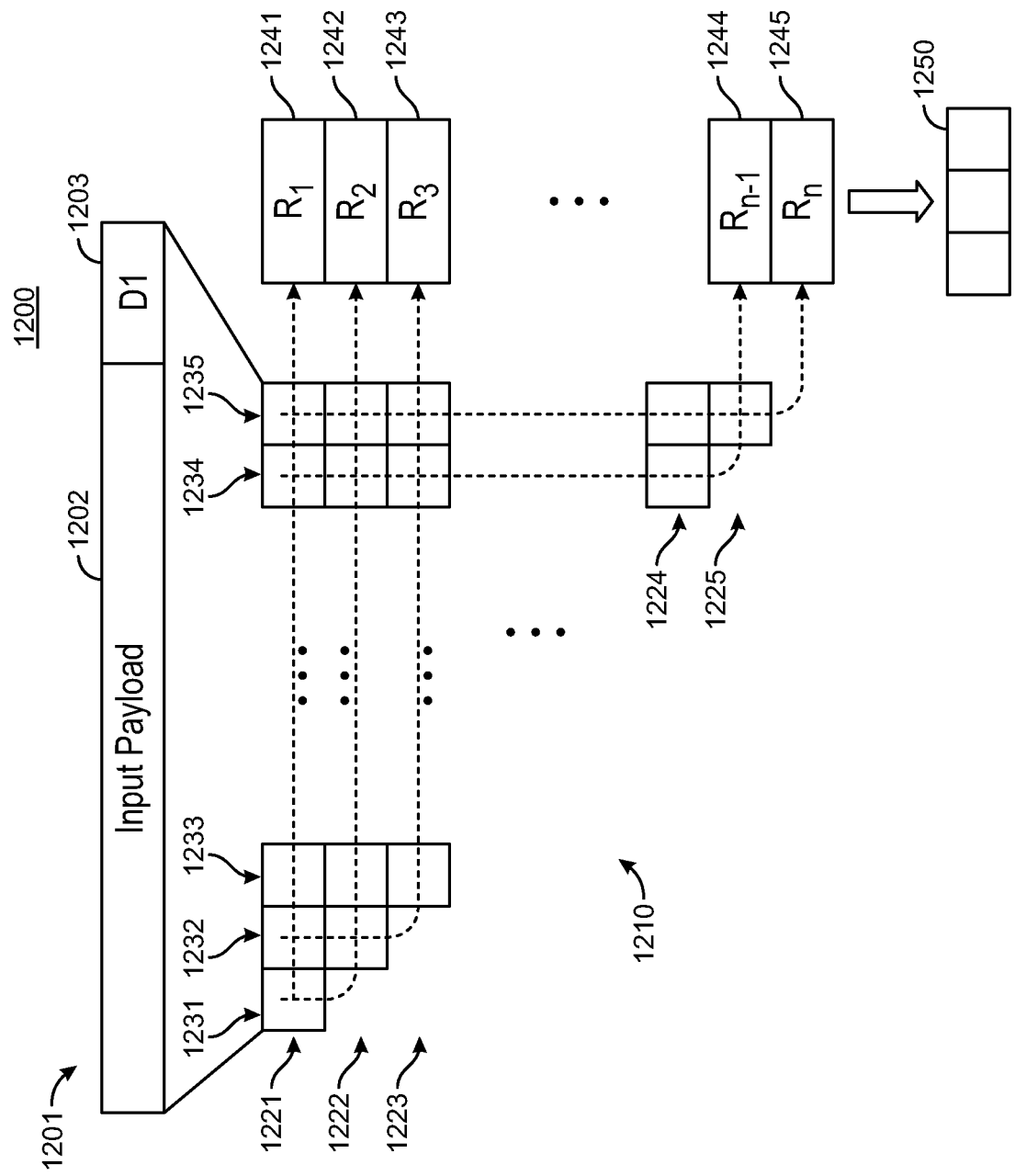
FIG. 12 is a diagram illustrating a mapping in an encoding process using a half folded-product code (HFPC) structure, according to some arrangements.
Figure 13:
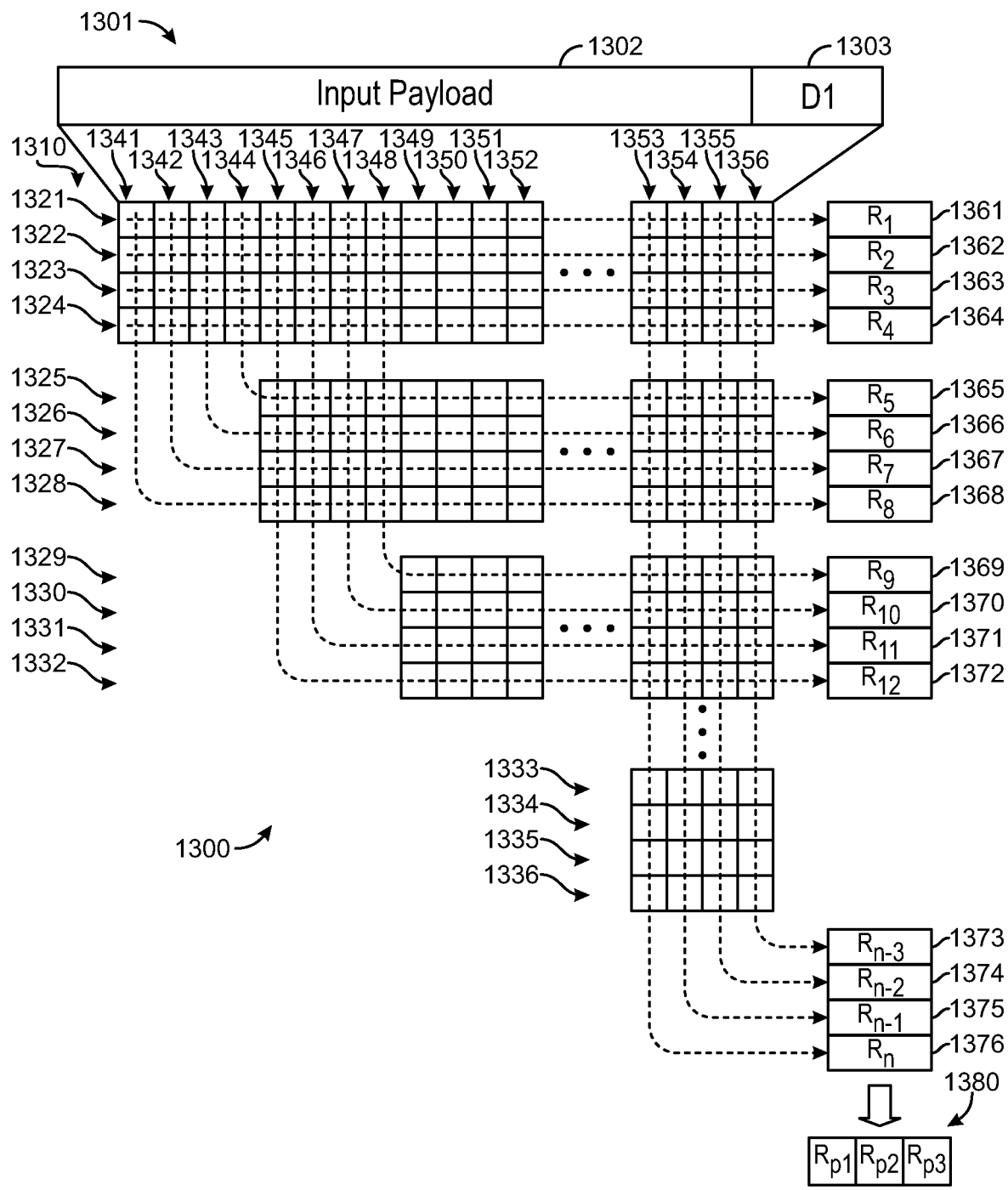
FIG. 13 is a diagram illustrating a mapping in an encoding process using a group HFPC structure, according to some arrangements.

FIG. 12 is a diagram illustrating a mapping 1200 in an encoding process using a HFPC structure according to various implementations. Referring to FIGS. 1 and 12-13, the mapping 1200 corresponds to the HFPC encoding scheme. The controller 110 (e.g., one or more ECC encoders of the ECC encoder/decoder 112) or the host 101 (e.g., one or more ECC encoders of the ECC encoder/decoder 102) can include or can otherwise implement an HFPC interleaver configured to organize (e.g., interleave or map) input bits 1201 into a form of a pseudo triangular matrix 1210. The input bits 1201 include input payload 1202 and signature bit(s) D1 1203 in some examples. The input payload 1202 includes the information bits. In some examples, the input payload 1202 includes information bits and redundancy bits introduced by the host 101 for RAID or erasure encoding (e.g., by the one or more ECC encoders of the ECC encoder/decoder 102). As described, an example of D1 1203 is the extra CRC bits. The bits of D1 1203 can also be referred to as "outer parity bits," given that CRC encoding can be viewed as an outer encoding process. The mapping from the input bits 1201 to the pseudo triangular matrix 1210 is maintained by the controller 110.

As shown, the pseudo triangular matrix 1210 has an upper triangular form, which has rows 1221-1225 (with rows between rows 1223 and 1224 omitted for clarity) and column 1231-1235 (with columns between columns 1233 and 1234 omitted for clarity). The pseudo triangular matrix 1210 is shown to have multiple blocks. Each block in the pseudo triangular matrix 1210 includes or otherwise represents two or more bits of the input bits 1201. The number of input bits per each block can be predetermined and equal for all the blocks of the pseudo triangular matrix 1210. Therefore, the HFPC is obtained by allowing any pair of component codes to encode (e.g., intersect at) more than one bit.

Conventionally, any pair of components HFPC intersect by only one common (intersection) bit. The disclosed implementations allow intersection of two or more common bits for any pair of component codes. The pseudo triangular matrix 1210 is "pseudo" given that each row has two or more bits (e.g., a block) more than the row immediately below that row, and each column has two or more bits (e.g., a block) more than the column immediately to its left. Thus, each row or column of the pseudo triangular matrix differs from an adjacent row or column by two or more bits In some implementations, the input bits 1201 are mapped to a block in the pseudo triangular matrix 1210 consecutively (by any suitable order). For example, the rows 1221-1225, in that order or in a reverse order, can be filled by the input bits 1201 consecutively block by block, from the left-most block of a row to a right-most block of a row, vice versa. In another example, the columns 1231-1235, in that order or in a reverse order, can be filled by the input bits 1201 consecutively block by block, from the top-most block of a column to a bottom-most block of a row, vice versa. In some implementations, the input bits 1201 are mapped to the pseudo triangular matrix 1210 pseudo-randomly. In other implementations, the input bits 1201 can be mapped to the pseudo triangular matrix 1210 using another suitable mapping mechanism. In one arrangement, the mapping is a one-to-one mapping, where each bit of the input bits 1201 is mapped to one bit of the pseudo triangular matrix 1210 and the total number of bits in the pseudo triangular matrix 1210 is equal to the number of input bits 1201. In another arrangement, the mapping may be one to many, where each bit of the input bits 1201 is mapped to one or more bits of the pseudo triangular matrix 1210 and the total number of bits in the pseudo triangular matrix 1210 is greater than the number of input bits 1201.

As shown, the upper triangular form has a same number of columns and a same number of rows. In the upper triangular form, the row 1221 contains the most bits out of all the rows in the pseudo triangular matrix 1210. The row 1222 has one less block than the row 1221. The row 1223 has one less block than the row 1222, and so on. The row 1224 has two blocks, and the row 1225, being the lowest row, has one block. In other words, any row in the pseudo triangular matrix 1210 (except for the row 1221) has one block less than the row immediately above. Similarly, in the upper triangular form, the column 1231, being the left-most column, has one block. The column 1232 has one more block than the column 1231. The column 1233 has one more block than the column 1232, and so on. The column 1235, being the right-most column, has the most blocks out of the columns in the pseudo triangular matrix 1210. In other words, any column in the pseudo triangular matrix 1210 (except for the column 1235) has one block less than the column immediately to the right.

Organizing or mapping the input bits 1201 (which includes the bits of the input payload 1202 and signature bit(s) D1 1203) in the upper triangular form of the pseudo triangular matrix 1210 allows every component code to be associated with bits in a row and a column that have the same size or nearly the same size in the manner described. For example, R1 1241 represents redundancy bits corresponding to a first component code. R1 1241 redundancy bits are obtained by encoding (e.g., folded component encoding) the input bits 1201 in a first row (e.g., the bits in the row 1221). R2 1242 redundancy bits are obtained by encoding (e.g., via folded component encoding) the input bits 1201 in a first column (e.g., the bits in the column 1231) and the second row (e.g., the bits in the row 1222). The number of total bits (e.g., the bits in the column 1231 plus the bits in the row 1222) encoded by R2 1242 are the same as the number of total bits (e.g., the bits in the row 1221) encoded by R1 1241. R3 1243 redundancy bits are obtained by encoding (e.g., via folded component encoding) the input bits 1201 in a second column (e.g., the bits in the column 1232) and the third row (e.g., the bits in the row 1223). The number of total bits (e.g., the bits in the column 1232 plus the bits in the row 1223) encoded by R3 1243 are the same as the number of total bits encoded by R2 1242 (as well as the number of total bits encoded by R1 1241). This process continues to obtain the last redundancy bits Rn 1245, which encodes (e.g., via folded component encoding) the input bits 1201 in the last column (e.g., the bits in the column 1235). Thus, each component code encodes a row and a column in the pseudo triangular matrix 1210, providing folded component encoding. An example of the folded component encoding is folded BCH encoding.

In other words, according to the mapping 1200, the input bits 1201 are mapped to the component codes of the ECC and are encoded as the mapped component codes. For example, the encoding process organizes or maps the input bits 1201 into a matrix (e.g., the pseudo triangular matrix form), and performs folded BCH encoding for every component code. Each of the input bits 1201 is encoded by two component codes. Each component code intersects with all other component codes. For component codes that encode the input bits 1201, the encoding process is performed such that the systematic bits of every component code are also encoded by all other component codes. The input bits encoded by any of the component codes are also encoded by every other component code in the ECC in a non-overlapping manner.

For example, the bits encoded by the component code corresponding to R3 1243 redundancy bits are also encoded by other component codes corresponding to R1 1241, R2 1242, and R4-Rn 1245. The bits at intersection of the row 1221 and the column 1232 are also encoded by the component code corresponding to R1 1241; the bits at the intersection of the row 1222 and the column 1232 are also encoded by the component code corresponding to R2 1242; the bits at the intersection of the row 1223 and the column 1234 are also encoded by the component code corresponding to Rn–1 1244; the bits at the intersection of the row 1223 and the column 1235 are also encoded by the component code corresponding to Rn 1245. Each block of bits encoded by any of the component code (e.g., the component code corresponding to the R3 1243) is encoded by that component code (e.g., the component code corresponding to the R3 1243) and no more than another one of the component codes, hence in a non-overlapping manner. As such, every component code is mutually dependent on all other component codes. The component codes together provide the encoding of each of the input bits 1201 using two component codes. The component codes have the same code rate given that each component code encodes a same number of bits.

In some implementations, parity bits can be generated via parity encoding. For example, folded parity encoding can be used to encode at least a portion of each of R1 1241-Rn 1245 into another component code (e.g., a folded product code 1250, which is a set of packets). The folded product code 1250 is comprised of the parity bits. This method of generating the parity bits can be efficient for obtaining simple hardware encoding implementations of HFPC, as the method can be iteratively decoded using various methods of hard or soft decoding.

In some examples, to provide an efficient structure, an incomplete portion (e.g., not an entirety) of each of R1 1241-Rn 1245 is encoded to obtain the folded product code 1250. This is because only the encoded versions of the input bits 1201 (e.g., the input payload 1202) needs to be decoded-decoding all of the redundancy bits R1 1241-Rn 1245 may prolong decoding time.

In some arrangements, a number of component codes used for encoding the redundancy bits can change depending on code rate and intersection size needed for the redundancy bits. In some arrangements, the redundancy bits may not be encoded at all, resulting irregular degrees of protection for the bits within the codeword. The irregular degrees of protection can be useful in some cases in terms of its waterfall capability. In some arrangements, the degree of protection for some information bits can be more than two by leveraging irregular half folded-product code encoding. For example, in addition to encoding the regular half folded-product code as described with reference to FIGS. 12-13, an additional encoding process can be applied to some of the input bits 1201 by encoding those bits with a different set of component codes. In some examples, the irregularity of the encoding process is caused by some of the input bits 1201 being encoded by more than two component codes while other bits of the input bits 1201 are encoded by two component codes, creating an unequal error protection of the bits within the codeword and resulting in improved correction capabilities (as applied to iterative decoding).

The redundancy bits R1 1241-Rn–m 1245 generated from the HFPC encoding process described with respect to FIG. 12 can be encoded by another, separate set of component codes used to encode all or a subset of these redundancy bits by another set of component codes. This forms a folded product code encoding over the redundancy bits R1 1241-Rn–m 1245, which, together with the information bits encoding, results in a low complexity encoding process.

As shown, the bits for each component code depend on the bits for another component code during decoding in the ECC structure corresponding to the mapping 1200. For conventional half product codes, every pair of component codes has only one common (intersection) information bit. In some implementations, a HFPC is obtained by using every pair of component codes encode more than one information bit. Accordingly, there can be two or more common (intersection) bits for every pair of component codes. In some implementations, the redundancy bits generated from the HFPC encoding process described herein are encoded by a separate set of component codes. For example, the separate set of component codes encode all or a subset of the redundancy bits to form a folded product code that encodes over the redundancy bits, which together with the information bits encoding, results in a low complexity encoding process.

In some implementations, multiple component codes can be grouped together and function like a single element according to the HFPC structures such that no dependency exists among the bits of the component codes within each group of component codes. Such encoding scheme reduces dependency of the HFPC structure and enables faster decoding implementation in hardware given that the encoding scheme is a low-complexity encoding and decoding code structure obtained by defining groups, where each group includes independent components.

In that regard, FIG. 13 is a diagram illustrating a mapping 1300 in an encoding process using a group HFPC structure according to various implementations. Referring to FIGS. 1 and 12-13, the mapping 1300 corresponds to the group HFPC encoding scheme. The HFPC interleaver of controller 110 (e.g., one or more ECC encoders of the ECC encoder/decoder 112) or the host 101 (e.g., one or more ECC encoders of the ECC encoder/decoder 102) is configured to organize (e.g., interleave) input bits 1301 into a form of a pseudo triangular matrix 1310. The input bits 1301 includes input payload 1302 and signature bit(s) D1 1303 in some examples. The input payload 1302 includes the information bits. As described, an example of D1 1303 is the extra CRC bits (outer parity bits). The mapping from the input bits 1301 to the pseudo triangular matrix 1310 is maintained by the controller 110.

As shown, the pseudo triangular matrix 1310 has an upper triangular form, which has rows 1321-1336 (with rows between rows 1332 and 1333 omitted for clarity) and columns 1341-1356 (with columns between columns 1352 and 1353 omitted for clarity). The pseudo triangular matrix 1310 is shown to have multiple blocks. Each block in the pseudo triangular matrix 1310 includes or otherwise represents two or more bits of the input bits 1301. The number of input bits per each block can be predetermined and equal for all the blocks of the pseudo triangular matrix 1310. The disclosed implementations allow intersection of two or more common bits for any pair of component codes.

In some implementations, the input bits 1301 are mapped to blocks in the pseudo triangular matrix 1310 consecutively (by any suitable order). For example, the rows 1321-1336, in that order or in a reverse order, can be filled by the input bits 1301 consecutively block-by-block, from the left-most block of a row to a right-most block of a row, or vice versa. In another example, the columns 1341-1356, in that order or in a reverse order, can be filled by the input bits 1301 consecutively block-by-block, from the top-most block of a column to a bottom-most block of a row, or vice versa. In some implementations, the input bits 1301 are mapped to the pseudo triangular matrix 1310 pseudo-randomly. In other implementations, the input bits 1301 can be mapped to the pseudo triangular matrix 1310 using another suitable mapping mechanism.

The blocks, rows, and columns in the pseudo triangular matrix 1310 can be grouped together. For example, the pseudo triangular matrix 1310 includes a first group of columns 1341-1344, a second group of columns 1345-1348, a third group of columns 1349-1352, . . . , and another group of columns 1353-1356. The pseudo triangular matrix 1310 includes a first group of rows 1321-1324, a second group of rows 1325-1328, a third group of rows 1329-1332, . . . , and another group of rows 1333-1336. Thus, the HFPC structure is divided into groups of 13 component codes. Every 4 component codes are encoded according to HFPC guidelines. Although 4 component code groups (e.g., 4 rows/columns) are shown in FIG. 13, any number (e.g., 2, 3, 6, 8, 10, 12, 16, and so on) of component codes can be grouped together.

As shown, the upper triangular form has a same number of columns and a same number of rows. The rows (e.g., the rows 1321-1324) or columns (e.g., the columns 1341-1344) in a same component code group have a same number of blocks and therefore have a same number of bits. In the upper triangular form, the rows 1321-1324 contain the most bits out of all the rows in the pseudo triangular matrix 1310. Each of the rows 1325-1328 has one less group of blocks (4 blocks, corresponding to the group of columns 1341-1344) than any of the rows 1321-1324. Each of the rows 1329-1332 has one less group of blocks (4 blocks, corresponding to the group of columns 1345-1348) than any of the rows 1325-1328, and so on. Each of the rows 1333-1336, being the lowest row, has a group of blocks (e.g., 4 blocks). In other words, any row in the pseudo triangular matrix 1310 (except for the rows 1321-1324) has 4 blocks less than a row of a group immediately above. Similarly, in the upper triangular form, each of the columns 1341-1344, being one of the left-most columns, has a group of blocks (e.g., 4 blocks). Each of the columns 1345-1348 has one more group of blocks (4 blocks, corresponding to the group of rows 1325-1328) than any of the columns 1341-1344. Each of the columns 1349-1352 has one more group of blocks (4 blocks, corresponding to the group of rows 1329-1332) than any of the columns 1345-1348, and so on. Each of the columns 1353-1356, being the right-most columns, has the greatest number of blocks. In other words, any column in the pseudo triangular matrix 1310 (except for the columns 1353-1356) has 4 blocks less than a column of a group immediately to the right.

Organizing or mapping the input bits 1301 in the upper triangular form of the pseudo triangular matrix 1310 allows every component code to be associated with bits in a row and a column that have the same size or nearly the same size in the manner described. The component codes within a same group encode separate sets of the input bits 1301 and are independent of each other.

R1 1361-R4 1364 are redundancy bits determined based on a same group of component codes. R1 1361 represents redundancy bits corresponding to a first component code and are obtained by encoding (e.g., folded component encoding) the input bits 1301 in a first row (e.g., the bits in the row 1321). R2 1362, R3 1363, and R4 1364 represent redundancy bits corresponding to additional component codes and are obtained by encoding (e.g., folded component encoding) the input bits 1301 in the bits in the rows 1322, 1323, and 1323, respectively. The bits used to determine each of R1 1361-R4 1364 do not overlap, and thus R1 1361-R4 1364 are independently determined.

R5 1365, R6 1366, R7 1367, and R8 1368 represent redundancy bits corresponding to additional component codes and are obtained by encoding (e.g., folded component encoding) the input bits 1301 in the bits in the column 1344 and row 1325, in the column 1343 and row 1326, in the column 1342 and row 427, and in the column 1341 and row 1328, respectively. The bits used to determine each of R5 1365-R8 1368 do not overlap, and thus R5 1365-R8 1368 are independently determined.

R9 1369, R10 1370, R11 1371, and R12 1372 represent redundancy bits corresponding to additional component codes and are obtained by encoding (e.g., folded component encoding) the input bits 1301 in the bits in the column 1348 and row 1329, in the column 1347 and row 1330, in the column 1346 and row 1331, and in the column 1345 and row 1332, respectively. The bits used to determine each of R9 1369-R12 1372 do not overlap, and thus R9 1369-R12 1372 are independently determined.

This process continues until Rn−3 1373, Rn−2 1374, Rn−1 1375, and Rn 1376 are determined. Rn−3 1373, Rn−2 1374, Rn−1 1375, and Rn 1376 represent redundancy bits corresponding to additional component codes and are obtained by encoding (e.g., folded component encoding) the input bits 1301 in the bits in the column 1356, in the column 1355, in the column 1354, and in the column 1353, respectively. The bits used to determine each of Rn−3 1373, Rn−2 1374, Rn−1 1375, and Rn 1376 do not overlap, and thus Rn−3 1373, Rn−2 1374, Rn−1 1375, and Rn 1376 are independently determined. An example of the folded component encoding is folded BCH encoding. In the special case that the component codes are divided into two groups of independent component codes, the resulting coding scheme degenerates to a folded product code.

According to the mapping 1300, the input bits 1301 are mapped to the component codes of the ECC and are encoded as the mapped component codes. For example, the encoding process organizes or maps the input bits 1301 in a matrix (e.g., a pseudo triangular matrix form), and performs folded BCH encoding for every component code. Each of the input bits 1301 is encoded by two component codes of different component code groups. Thus, any component code intersects with all other component codes that are in the same group as the group to which that component code belongs. For component codes that encode the input bits 1301, the encoding process is performed such that the systematic bits of every component code are also encoded by all other component codes that belong to different groups, with dependency within a component code group being eliminated. The input bits encoded by a given component code of the component codes are also encoded by every other component code (that is not in the same group as that component code) in a non-overlapping manner. For example, the bits encoded by the component code corresponding to R9 1369 redundancy bits are also encoded by other component codes corresponding to R1 1361-R8 1368 and R11-Rn 1376 that are not in the group in which the component code corresponding to R9 1369 redundancy bits belongs. Each block of bits encoded by any of the component code (e.g., the component code corresponding to the R9 1369) is encoded by that component code (e.g., the component code corresponding to the R9 1369) and no more than another one of the component codes, hence in a non-overlapping manner. As such, every component code is mutually dependent on all other component codes that are not within the same group. The component codes together provide the encoding of each input bits 1301 using two component codes.

In some implementations, parity bits can be generated via parity encoding. For example, folded parity encoding can be used to encode at least a portion of each of R1 1361-Rn 1376 into another component code (e.g., a folded product code 1380, which is a set of packets). The folded product code 1380 (e.g., having Rp1-Rp3) is the parity bits. This method of generating the parity bits can be efficient for obtaining simple hardware encoding implementations of HFPC, as the method can be iteratively decoded using various methods of hard or soft decoding.

While a hard decoder decodes a message based on received bits (based on hard decision), soft input can be obtained by soft sampling, e.g., performing multiple reads from a flash device, where each read operation uses a different one of the read thresholds. The read thresholds can be configured such that soft information or soft metrics such as but not limited to, a log-likelihood ratio (LLR), can be computed per bit. An LLR is defined as (Equation 5):

$$LLR(b_i) = \log\left(\frac{P(b_i = 1 \mid y)}{P(b_i = 0 \mid y)}\right), \quad (5)$$

where y is a channel output and $b_i$ is the $i^{th}$ bit of a page. The LLR expression can be substantially simplified in some examples, for an additive white Gaussian noise (AWGN) channel model. The AWGN can be used to approximate lobes' distribution in a flash device. By assuming an AWGN channel (Equation 6):

$$P(b_i \mid y) = \frac{1}{\sqrt{2\pi\sigma^2}} \exp\left(-\frac{(y - b_i)^2}{2\sigma^2}\right), \quad (6)$$

where y is the AWGN channel output. Therefore, in some examples, the LLR($b_i$) becomes (Equation 7):

$$LLR(b_i) = \frac{2y}{\sigma^2}, \quad (7)$$

where the LLR per bit is created during multiple flash reads, as a quantized version of an AWGN channel. In some arrangements, the quantization level per threshold can be directly determined by the number of reads, as a base-two logarithm of a read counter.

After multiple reads have been conducted, and once LLRs are available for all codeword bits, a decoding process may begin. There can be many possible approximations for mapping of LLR values for implementation efficiency, such as mapping to fixed point integer values. A product code corresponds to an n×n array in which each column and row is a codeword in component code. Several known decoding algorithms can be used for a product code when soft information is available to a decoder. The general approach includes decoding each component code separately to generate output reliabilities per bit, which is applied and used for iterative decoding of the component code. For example, soft decoding of a BCH component code needs soft information per bit. Iterative soft decoding includes a process of performing soft decoding on some of component codes, and applying the most likely corrections under different conditions. One approach for soft decoding is enumeration over low reliability bits, while trying to solve the BCH code per hypothesis. Other approaches include enumeration on least reliable bits together with assumptions that all errors are within a set of Q×t bits and performing erasure decoding, where t is the number of correctable bits (e.g., t=3), Q stands for the Galois field ($2^Q$) that is used for the code elements (e.g., Q=10). Q and t are parts of the parameters of the code, and Q×t is the number of parity bits of the codeword. This approach is known as ordered statistics decoding.

If the BCH component codes with decoding capability of t<4 are used, soft decoding can be efficiently implemented in terms of computational complexity, or implemented in hardware implementation, as per hypothesis a solution can directly be computed using a syndrome lookup table (LUT). Performing any type of soft decoding for a component code includes creating a list of candidates of the most likely error hypotheses for valid codeword corrections. A soft score for every result of valid codeword can be computed by (Equation 8):

$$S_{LLR} = \sum_{b_m \in C} |LLR(b_m)|, \quad (8)$$

where C is the set of error bits, and $b_m$ is a location of an error bit. In some examples, the selected error hypothesis of a soft component decoder has the smallest $S_{LLR}$ score.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method of verifying correction detection in a memory device, the computer-implemented method comprising:

selecting a plurality of memory locations at a memory device, the memory locations corresponding to a first page including a first plurality of bits and a second plurality of pages including corresponding second pluralities of bits;

obtaining, based on the second pluralities of bits, extrinsic page information for a proposed error solution including a third plurality of bits indicating a reliability of respective bits of the first plurality of bits; and rejecting, in response to a determination that the proposed error solution indicates a modification to a reliable bit among the first plurality of bits, the proposed error solution to eliminate a false correction of the first plurality of bits.

2. The method of claim 1, further comprising:

determining, in response to the rejecting, that an error metric corresponding to the first plurality of bits satisfies a threshold indicating an error state in the first plurality of bits; and decoding, the determining that the error metric satisfies the threshold, the one or more bits among the first plurality of bits.

3. The method of claim 1, further comprising:

buffering the first page and the second page;

encoding, based on one or more decoded bits among the first plurality of bits, a first plurality of encoded bits corresponding to the first page;

encoding the codeword with one or more decoded bits; and storing the first plurality of encoded bits to one or more of the memory locations corresponding to the first page.

4. The method of claim 1, further comprising:

obtaining, based on the second pluralities of bits, the extrinsic page including the third plurality of bits, the memory locations corresponding to a third page among the second plurality of pages.

5. The method of claim 3, the memory locations comprising a row of memory locations including one or more of the first page, the second plurality of pages, and the third page.

6. The method of claim 1, further comprising:

buffering a plurality of codewords including a codeword having the first page and the second plurality of pages;

encoding, subsequent to the buffering the plurality of codewords, the plurality of codewords, including by encoding the codeword with one or more decoded bits in response to the determining the indication of error; and transmitting, subsequent to the encoding the plurality of codewords, the plurality of codewords including the codeword.

7. The method of claim 1, further comprising:

transmitting, in response to determining that the codeword satisfies a reliability threshold corresponding to a decoder, the codeword; and encoding, in response to determining that the codeword does not satisfy the reliability threshold, the codeword with one or more decoded bits in response to the determining the indication of error.

8. The method of claim 1, the first plurality of bits, the second plurality of bits, and the third plurality of bits corresponding to respective bit positions of a row of memory locations.

9. A memory system comprising:

a non-volatile memory; and a controller configured to:

select a plurality of memory locations at the non-volatile memory, the memory locations including a first page having a first plurality of bits and a second plurality of pages having corresponding second pluralities of bits;

obtain, based on the second pluralities of bits, extrinsic page information for a proposed error solution based on a third plurality of bits indicating a reliability of respective bits of the first plurality of bits; and reject, in response to a determination that the proposed error solution indicates a modification to a reliable bit among the first plurality of bits, the proposed error solution to eliminate a false correction of the first plurality of bits.

10. The memory system of claim 9, the controller further configured to:

determine, in response to the rejecting, that an error metric corresponding to the first plurality of bits satisfies a threshold indicating an error state in the first plurality of bits; and decode, the determining that the error metric satisfies the threshold, the one or more bits among the first plurality of bits.

11. The memory system of claim 9, the controller further configured to:

buffer the first page and the second page;

encode, based on one or more decoded bits among the first plurality of bits, a first plurality of encoded bits corresponding to the first page;

encode the codeword with one or more decoded bits; and store the first plurality of encoded bits to one or more of the memory locations corresponding to the first page.

12. The memory system of claim 9, the controller further configured to:

obtain, based on the second pluralities of bits, the extrinsic page including the third plurality of bits, the memory locations corresponding to a third page among the second plurality of pages.

13. The memory system of claim 11, the memory locations comprising a row of memory locations including one or more of the first page, the second page, and the third page.

14. The memory system of claim 9, the controller further configured to:

buffer a plurality of codewords including a codeword having the first page and the second plurality of pages;

encode, subsequent to the buffering the plurality of codewords, the plurality of codewords, including by encoding the codeword with one or more decoded bits in response to the determining the indication of error; and transmit, subsequent to the encoding the plurality of codewords, the plurality of codewords including the codeword.

15. The memory system of claim 9, the controller further configured to:

transmit, in response to determining that the codeword satisfies a reliability threshold corresponding to a decoder, the codeword; and encode, in response to determining that the codeword does not satisfy the reliability threshold, the codeword with one or more decoded bits in response to the determining the indication of error.

16. The memory system of claim 9, the first plurality of bits, the second plurality of bits, and the third plurality of bits corresponding to respective bit positions of a row of memory locations.

17. A non-transitory computer readable medium including one or more instructions stored thereon and executable by a processor to:

select, by a processor, a plurality of memory locations at a memory device, the memory locations corresponding to a first page including a first plurality of bits and a second plurality of pages including corresponding second pluralities of bits;

obtain, by the processor and based on the second plurality of bits, extrinsic page information for a proposed error solution including a third plurality of bits indicating a reliability of respective bits of the first plurality of bits; and reject, in response to a determination that the proposed error solution indicates a modification to a reliable bit among the first plurality of bits, the proposed error solution to eliminate a false correction of the first plurality of bits.

18. The computer readable medium of claim 17, wherein the computer readable medium further includes one or more instructions executable by the processor to:

determine, in response to the rejecting, that an error metric corresponding to the first plurality of bits satisfies a threshold indicating an error state in the first plurality of bits; and decode, the determining that the error metric satisfies the threshold, the one or more bits among the first plurality of bits.

19. The computer readable medium of claim 17, wherein the computer readable medium further includes one or more instructions executable by the processor to:

buffer the first page and the second page;

encode, based on one or more decoded bits among the first plurality of bits, a first plurality of encoded bits corresponding to the first page;

encode the codeword with one or more decoded bits; and store the first plurality of encoded bits to one or more of the memory locations corresponding to the first page.

20. The computer readable medium of claim 17, wherein the computer readable medium further includes one or more instructions executable by the processor to:

buffer a plurality of codewords including a codeword having the first page and the second plurality of pages;

encode, subsequent to the buffering the plurality of codewords, the plurality of codewords, including by encoding the codeword with one or more decoded bits in response to the determining the indication of error; and transmit, subsequent to the encoding the plurality of codewords, the plurality of codewords including the codeword.

* * * * *